(12) United States Patent
Nelson et al.

(10) Patent No.: US 10,669,147 B2
(45) Date of Patent: *Jun. 2, 2020

(54) CROSSOVER PROTECTION SYSTEM GRAPHICAL USER INTERFACES

(71) Applicant: Knappco, LLC, Hamilton, OH (US)

(72) Inventors: Mikael A. Nelson, Kansas City, MO (US); Kapil Pandey, Bangalore (IN); Scott A. Finnell, Parkville, MO (US); Jeffrey J. Blair, Kansas City, MO (US)

(73) Assignee: KNAPPCO, LLC, Hamilton, OH (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/183,990

(22) Filed: Nov. 8, 2018

(65) Prior Publication Data

US 2019/0084821 A1 Mar. 21, 2019

Related U.S. Application Data

(63) Continuation of application No. 14/922,646, filed on Oct. 26, 2015, now Pat. No. 10,207,912.

(Continued)

(51) Int. Cl.
*G05B 15/02* (2006.01)
*B67D 7/04* (2010.01)
*B67D 7/34* (2010.01)

(52) U.S. Cl.
CPC .............. *B67D 7/04* (2013.01); *B67D 7/342* (2013.01); *B67D 7/348* (2013.01); *G05B 15/02* (2013.01);
(Continued)

(58) Field of Classification Search
CPC .... B67D 2007/0446; B67D 2007/0448; B67D 2007/0449; B67D 7/04; B67D 7/342; B67D 7/348; G05B 15/02
See application file for complete search history.

(56) References Cited

U.S. PATENT DOCUMENTS 5,349,994 A  9/1994 Koeninger
5,875,921 A  3/1999 Osgar et al.
(Continued)

FOREIGN PATENT DOCUMENTS

CN  101789093 A  7/2010
CN  103049841 A  4/2013
(Continued)

OTHER PUBLICATIONS

International Search Report and Written Opinion dated Mar. 31, 2016 for PCT/US2015/057987 filed Oct. 29, 2015. pp. 1-17.
(Continued)

*Primary Examiner* — Michael D Masinick
(74) *Attorney, Agent, or Firm* — Dinsmore & Shohl LLP

(57) ABSTRACT

Crossover protection system graphical user interfaces, crossover protection systems that display graphical user interfaces, and methods for pairing tank delivery connectors with product delivery vehicle systems are provided. A tank delivery connector reads a tank tag with a tank tag reader, and transmits a tank tag indicator associated with the tank tag with network interface hardware. An electronic control unit receives the tank tag indicator with network interface hardware, determines a distribution tank fuel type associated with a distribution tank based on the tank tag indicator, determines that the tank delivery connector is associated with a tank compartment of a product delivery vehicle based on the tank tag indicator, and displays a graphical user interface on the display. The graphical user interface includes a tank delivery connector graphic displayed proximate a tank compartment graphic to indicate that the tank delivery connector is associated with the first tank compartment.

20 Claims, 15 Drawing Sheets

Related U.S. Application Data

(60) Provisional application No. 62/076,533, filed on Nov. 7, 2014.

(52) U.S. Cl.
CPC ............... *B67D 2007/0446* (2013.01); *B67D 2007/0448* (2013.01); *B67D 2007/0449* (2013.01)

(56) References Cited

U.S. PATENT DOCUMENTS

| | | | |
|---|---|---|---|
| 6,149,033 A | 11/2000 | Poleshuk | |
| 6,186,196 B1 | 2/2001 | Leigh | |
| 6,209,576 B1 | 4/2001 | Davis | |
| 6,237,647 B1 | 5/2001 | Pong et al. | |
| 6,244,287 B1 | 6/2001 | Hill et al. | |
| 6,347,723 B1* | 2/2002 | Barlian | B67D 7/344 141/231 |
| 2004/0085200 A1* | 5/2004 | McConnel | G01F 23/0076 340/450.2 |
| 2010/0023170 A1* | 1/2010 | Sherwood | G05B 9/02 700/282 |
| 2010/0089486 A1* | 4/2010 | Koeninger | B67D 7/3209 141/2 |
| 2010/0141483 A1 | 6/2010 | Thacher et al. | |
| 2010/0280670 A1 | 11/2010 | Haul | |
| 2011/0120589 A1 | 5/2011 | Evans | |
| 2014/0129038 A1* | 5/2014 | Finnell | G05D 7/0629 700/283 |
| 2014/0316589 A1* | 10/2014 | Lichtash | B67D 7/346 700/282 |
| 2015/0090363 A1 | 4/2015 | Evans | |

FOREIGN PATENT DOCUMENTS

| | | |
|---|---|---|
| EP | 546782 A1 | 6/1993 |
| EP | 568837 A2 | 11/1993 |
| EP | 518662 B1 | 5/1995 |
| EP | 805121 A1 | 11/1997 |
| EP | 1354847 A1 | 10/2003 |
| EP | 1832548 A1 | 9/2007 |
| EP | 2234042 A1 | 9/2010 |
| GB | 2293658 A | 4/1996 |
| GB | 2416756 B | 11/2008 |
| JP | 06312795 A | 11/1994 |
| JP | 07242144 A | 9/1995 |
| JP | 09048500 A | 2/1997 |
| WO | WO0050335 A1 | 8/2000 |
| WO | 2010082809 A1 | 7/2010 |
| WO | 2012031323 A1 | 3/2012 |
| WO | 2013023129 A1 | 2/2013 |

OTHER PUBLICATIONS

International Preliminary Report on Patentability dated May 21, 2015 related to PCT/US2013/069203 filed Nov. 8, 2013.
Custody Transfer for Fuel Tankers: Dezidata Electronic Dipstick System. Retrieved Oct. 22, 2015, from http://www.gasso.com/sites/gasso.com/files/Gasso_Dezi_Data/pdf, 8 pages.

* cited by examiner

CROSSOVER PROTECTION SYSTEM GRAPHICAL USER INTERFACES

CROSS-REFERENCE TO RELATED APPLICATIONS

The present application is a continuation of U.S. patent application Ser. No. 14/922,646, entitled "Crossover Protection System Graphical User Interfaces," filed Oct. 26, 2015, which claims the benefit of U.S. Provisional Application No. 62/076,533, entitled "Crossover Protection System Graphical User Interfaces," filed Nov. 7, 2014, the entirety of which applications are hereby incorporated by reference.

BACKGROUND

Field

Embodiments provided herein generally relate to graphical user interfaces, and more specifically, to crossover protection system graphical user interfaces.

Technical Background

Crossover protection systems may be used to prevent the undesirable crossover, cross contamination, and/or co-mingling that result when a liquid is delivered from a tank compartment of a product delivery vehicle to a distribution tank of a distribution facility that contains a different type of liquid. It may be desirable for a user of such a system to be provided a graphical user interface to view information pertaining to the system and/or to provide input to the system. Accordingly, a need exists for crossover protection system graphical user interfaces.

SUMMARY

In one embodiment, a crossover protection system includes an electronic control unit, a tank delivery connector communicatively coupled to the electronic control unit, and a display communicatively coupled to the electronic control unit. The electronic control unit includes a first processor, first network interface hardware communicatively coupled to the first processor, a first memory module communicatively coupled to the first processor, and first machine readable instructions stored in the first memory module. The tank delivery connector includes a second processor, a tank tag reader communicatively coupled to the second processor, second network interface hardware communicatively coupled to the second processor, a second memory module communicatively coupled to the second processor, and second machine readable instructions stored in the second memory module. When executed by the second processor, the second machine readable instructions stored in the second memory module cause the tank delivery connector to read a tank tag with the tank tag reader, and transmit a tank tag indicator associated with the tank tag with the second network interface hardware. When executed by the first processor, the first machine readable instructions stored in the first memory module cause the electronic control unit to receive the tank tag indicator with the first network interface hardware, determine a distribution tank fuel type associated with a distribution tank based on the tank tag indicator, determine that the tank delivery connector is associated with a first tank compartment of a product delivery vehicle based on the tank tag indicator, and display a graphical user interface on the display. The graphical user interface includes a schematic representation of the product delivery vehicle. The schematic representation includes a plurality of tank compartment graphics. Each tank compartment graphic of the plurality of tank compartment graphics depicts a tank compartment of the product delivery vehicle. The plurality of tank compartment graphics includes a first tank compartment graphic and a second tank compartment graphic. The first tank compartment graphic is associated with the first tank compartment of the product delivery vehicle and the second tank compartment graphic is associated with a second tank compartment of the product delivery vehicle. The graphical user interface further includes a tank delivery connector graphic displayed proximate the first tank compartment graphic to indicate that the tank delivery connector is associated with the first tank compartment.

In another embodiment, a crossover protection system includes an electronic control unit, a tank delivery connector communicatively coupled to the electronic control unit, and a display communicatively coupled to the electronic control unit. The electronic control unit includes a first processor, first network interface hardware communicatively coupled to the first processor, a first memory module communicatively coupled to the first processor, and first machine readable instructions stored in the first memory module. The tank delivery connector includes a second processor, a tank tag reader communicatively coupled to the second processor, second network interface hardware communicatively coupled to the second processor, a second memory module communicatively coupled to the second processor, and second machine readable instructions stored in the second memory module. When executed by the second processor, the second machine readable instructions stored in the second memory module cause the tank delivery connector to read a tank tag with the tank tag reader, and transmit a tank tag indicator associated with the tank tag with the second network interface hardware. When executed by the first processor, the first machine readable instructions stored in the first memory module cause the electronic control unit to receive the tank tag indicator with the first network interface hardware, determine a distribution tank fuel type associated with a distribution tank based on the tank tag indicator, and display a graphical user interface on the display. The graphical user interface includes a schematic representation of a product delivery vehicle. The schematic representation includes a plurality of tank compartment graphics. Each tank compartment graphic of the plurality of tank compartment graphics depicts a tank compartment of the product delivery vehicle. The plurality of tank compartment graphics includes a first tank compartment graphic and a second tank compartment graphic. The first tank compartment graphic is associated with a first tank compartment including a first fuel type that matches the distribution tank fuel type. The second tank compartment graphic is associated with a second tank compartment including a second fuel type that does not match the distribution tank fuel type. The graphical user interface further includes an inactive graphic indication displayed proximate the second tank compartment graphic.

In yet another embodiment, a crossover protection system includes a processor, a memory module communicatively coupled to the processor, a display communicatively coupled to the processor, and machine readable instructions stored in the memory module. When executed by the processor, the machine readable instructions cause the crossover protection system to display a graphical user interface on the display. The graphical user interface includes a schematic representation of a product delivery vehicle. The schematic representation includes a plurality of tank compartment graphics. Each tank compartment graphic of the plurality of tank compartment graphics depicts a tank compartment of the product delivery vehicle. The plurality of tank compartment graphics includes a first tank compartment graphic and a second tank compartment graphic. The first tank compartment graphic is associated with a first tank compartment of the product delivery vehicle and the second tank compartment graphic is associated with a second tank compartment of the product delivery vehicle. When executed by the processor, the machine readable instructions further cause the crossover protection system to receive a bypass request to bypass crossover protection of the first tank compartment, and display a bypass graphic indication proximate the first tank compartment graphic in response to receiving the bypass request.

In yet another embodiment, a method for pairing a tank delivery connector including a magnetic sensor and first network interface hardware with a product delivery vehicle system including a magnet and second network interface hardware includes positioning the tank delivery connector proximate the magnet of the product delivery vehicle system, generating an output signal with the magnetic sensor in response to the positioning of the tank delivery connector proximate the magnet, transmitting a message including an identifier with the first network interface hardware of the tank delivery connector in response to the output signal generated by the magnetic sensor, receiving the message with the second network interface hardware of the product delivery vehicle system, and in response to receiving the message, pairing the tank delivery connector and the product delivery vehicle system.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

A product delivery vehicle (e.g., a fuel truck) may deliver liquid (e.g., gasoline or diesel fuel) to a distribution tank (e.g., an underground distribution tank containing gasoline or an underground distribution tank containing diesel fuel) at a distribution facility (e.g., a gas station). Such product delivery vehicles may include multiple tank compartments, each of which contains a different liquid (e.g., a gasoline tank compartment, a diesel tank compartment, etc.). Several distribution tanks may be located at the distribution facility, such as a gasoline distribution tank, a diesel distribution tank, etc. When the product delivery vehicle delivers liquid to the distribution facility, it is desirable to prevent crossover, cross contamination, or co-mingling of a liquid from a tank compartment of the product delivery vehicle into a distribution tank that contains a different liquid. For example, it may be desirable to prevent the introduction of gasoline from a gasoline tank compartment of a product delivery vehicle into a diesel distribution tank. Likewise, it may be desirable to prevent the introduction of diesel fuel from a diesel fuel tank compartment of a product delivery vehicle into a gasoline distribution tank.

A crossover protection system (such as, but not limited to, the crossover protection system described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference) may be mounted on a delivery vehicle to prevent the undesirable crossover, cross contamination, and/or co-mingling between dissimilar tank compartments and distribution tanks.

Embodiments described herein display information on a display screen to facilitate use of a crossover protection system. In particular, embodiments described herein include graphical user interfaces displayed on display screens of crossover protection systems that mitigate the risk of potential crossover and allow an operator of the product delivery vehicle and crossover protection system to deliver multiple types of fuel or other liquid to distribution tanks at a distribution facility in a quick and efficient manner while mitigating the risk of crossover. Furthermore, the graphical user interfaces described herein may allow a user of a crossover protection system to easily and quickly ascertain information pertaining to the fuel types loaded in the various compartments of a fuel delivery vehicle and to easily and quickly ascertain the status of various system components.

Figure 1:
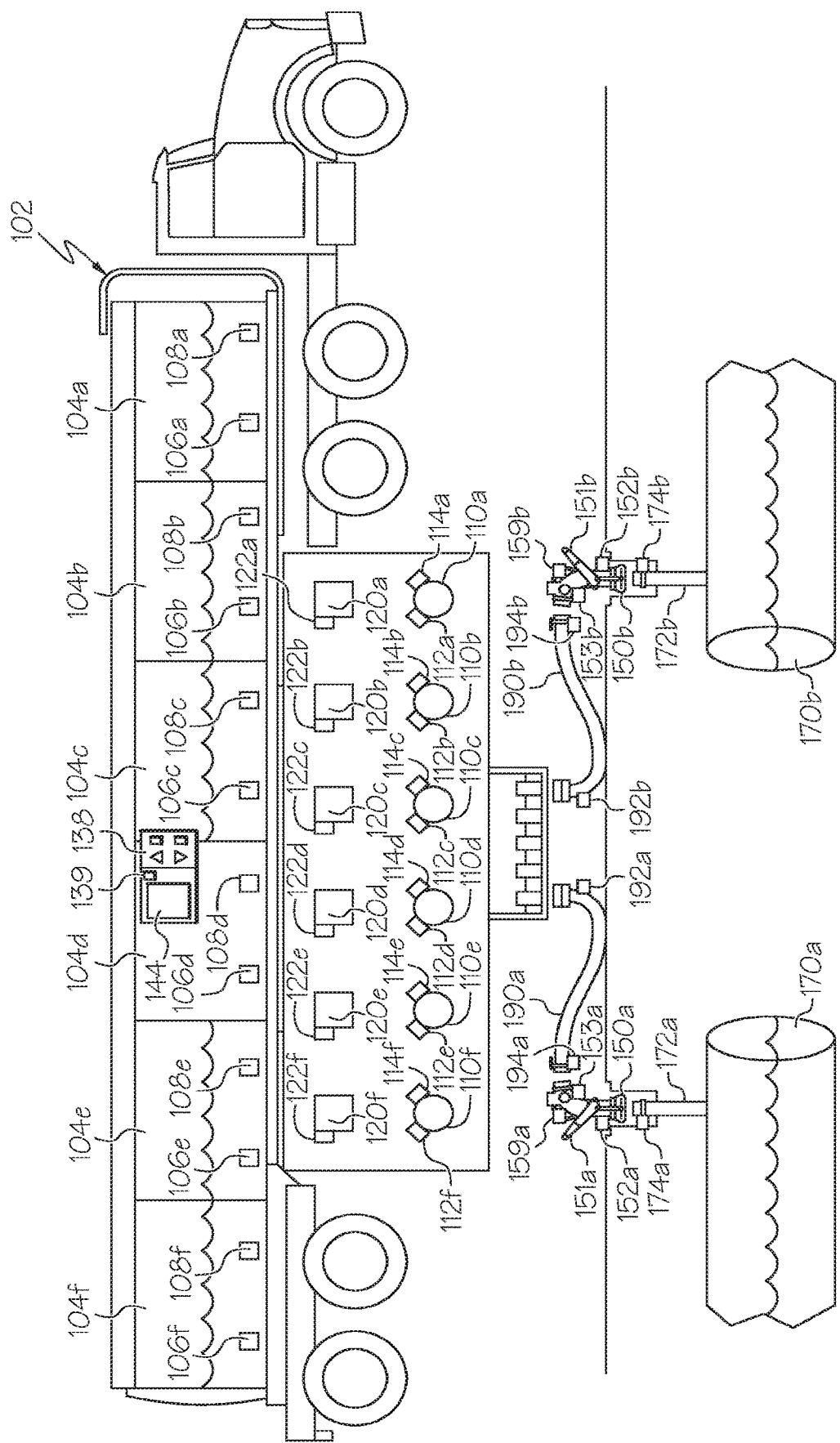
FIG. 1 schematically depicts a product delivery vehicle, tank delivery connectors, and delivery hoses, according to one or more embodiments of the present disclosure.

Referring now to FIG. 1, a product delivery vehicle 102 is depicted that may deliver fluid from tank compartments of the product delivery vehicle 102 to a first distribution tank 170a and a second distribution tank 170b at a distribution facility. FIG. 1 also depicts a first delivery hose 190a, a second delivery hose 190b, a first tank delivery connector 150a, and a second tank delivery connector 150b, which may be utilized to facilitate the delivery of fluid from the product delivery vehicle 102 to the first distribution tank 170a and/or the second distribution tank 170b, as will be described further below. The various components of the product delivery vehicle 102, the first delivery hose 190a, the second delivery hose 190b, the first distribution tank 170a, the second distribution tank 170b, the first tank delivery connector 150a, and the second tank delivery connector 150b, will be described in turn.

Still referring to FIG. 1, the product delivery vehicle 102 includes a plurality of tank compartments 104a, . . . , 104f, a plurality of fluid property sensors 106a, . . . , 106f, a plurality of pressure sensors 108a, . . . , 108f, a plurality of control valves 110a, . . . , 110f, a plurality of control valve sensors 112a, . . . , 112f, a plurality of hose tag readers 114a, . . . , 114f, a plurality of solenoid valves 120a, . . . , 120f, a plurality of solenoid valve sensors 122a, . . . , 122f, tactile input hardware 138, a magnet 139, and a display 144. The various components and relationships thereof of the product delivery vehicle 102 will now be described.

Still referring to the product delivery vehicle 102 of FIG. 1, the plurality of tank compartments 104a, . . . , 104f includes a first tank compartment 104a, a second tank compartment 104b, a third tank compartment 104c, a fourth tank compartment 104d, a fifth tank compartment 104e, and a sixth tank compartment 104f. In other embodiments, the product delivery vehicle 102 may include more than or less than six tank compartments. Each of the tank compartments may contain a liquid, such as a particular type of fuel, to be delivered to the distribution tanks at the distribution facility.

Still referring to FIG. 1, the plurality of fluid property sensors 106a, . . . , 106f includes a first fluid property sensor 106a, a second fluid property sensor 106b, a third fluid property sensor 106c, a fourth fluid property sensor 106d, a fifth fluid property sensor 106e, and a sixth fluid property sensor 106f. The first fluid property sensor 106a is associated with the first tank compartment 104a. The first fluid property sensor 106a is positioned to contact fluid contained within the first tank compartment 104a and to output a signal indicative of a sensed fluid property (e.g., a viscosity, a density, a dielectric constant, a temperature, etc.) of the fluid contained within the first tank compartment 104a. In some embodiments, the first fluid property sensor 106a is positioned in the first tank compartment 104a. In some embodiments, the first fluid property sensor 106a is positioned in a pipe or conduit fluidly coupled to the first tank compartment 104a, such as a pipe fluidly coupled to a bottom of the first tank compartment 104a.

The second fluid property sensor 106b is associated with the second tank compartment 104b. The second fluid property sensor 106b is positioned to contact fluid contained within the second tank compartment 104b and to output a signal indicative of a sensed fluid property (e.g., a viscosity, a density, a dielectric constant, a temperature, etc.) of the fluid contained within the second tank compartment 104b. In some embodiments, the second fluid property sensor 106b is positioned in the second tank compartment 104b. In some embodiments, the second fluid property sensor 106b is positioned in a pipe or conduit fluidly coupled to the second tank compartment 104b, such as a pipe fluidly coupled to a bottom of the second tank compartment 104b.

The third fluid property sensor 106c is associated with the third tank compartment 104c. The third fluid property sensor 106c is positioned to contact fluid contained within the third tank compartment 104c and to output a signal indicative of a sensed fluid property (e.g., a viscosity, a density, a dielectric constant, a temperature, etc.) of the fluid contained within the third tank compartment 104c. In some embodiments, the third fluid property sensor 106c is positioned in the third tank compartment 104c. In some embodiments, the third fluid property sensor 106c is positioned in a pipe or conduit fluidly coupled to the third tank compartment 104c, such as a pipe fluidly coupled to a bottom of the third tank compartment 104c.

The fourth fluid property sensor 106d is associated with the fourth tank compartment 104d. The fourth fluid property sensor 106d is positioned to contact fluid contained within the fourth tank compartment 104d and to output a signal indicative of a sensed fluid property (e.g., a viscosity, a density, a dielectric constant, a temperature, etc.) of the fluid contained within the fourth tank compartment 104d. In some embodiments, the fourth fluid property sensor 106d is positioned in the fourth tank compartment 104d. In some embodiments, the fourth fluid property sensor 106d is positioned in a pipe or conduit fluidly coupled to the fourth tank compartment 104d, such as a pipe fluidly coupled to a bottom of the fourth tank compartment 104d.

The fifth fluid property sensor 106e is associated with the fifth tank compartment 104e. The fifth fluid property sensor 106e is positioned to contact fluid contained within the fifth tank compartment 104e and to output a signal indicative of a sensed fluid property (e.g., a viscosity, a density, a dielectric constant, a temperature, etc.) of the fluid contained within the fifth tank compartment 104e. In some embodiments, the fifth fluid property sensor 106e is positioned in the fifth tank compartment 104e. In some embodiments, the fifth fluid property sensor 106e is positioned in a pipe or conduit fluidly coupled to the fifth tank compartment 104e, such as a pipe fluidly coupled to a bottom of the fifth tank compartment 104e.

The sixth fluid property sensor 106f is associated with the sixth tank compartment 104f. The sixth fluid property sensor 106f is positioned to contact fluid contained within the sixth tank compartment 104f and to output a signal indicative of a sensed fluid property (e.g., a viscosity, a density, a dielectric constant, a temperature, etc.) of the fluid contained within the sixth tank compartment 104f. In some embodiments, the sixth fluid property sensor 106f is positioned in the sixth tank compartment 104f. In some embodiments, the sixth fluid property sensor 106f is positioned in a pipe or conduit fluidly coupled to the sixth tank compartment 104f, such as a pipe fluidly coupled to a bottom of the sixth tank compartment 104f.

In some embodiments, one or more of the plurality of fluid property sensors 106a, . . . , 106f may be a fluid property sensor as described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference. In some embodiments, one or more of the plurality of fluid property sensors $106a, \ldots, 106f$ is a tuning fork sensor model number FPS2800B12C4 by Measurement Specialties. However, it should be understood that alternative fluid property sensors may be used.

Still referring to FIG. 1, the plurality of pressure sensors $108a, \ldots, 108f$ includes a first pressure sensor $108a$, a second pressure sensor $108b$, a third pressure sensor $108c$, a fourth pressure sensor $108d$, a fifth pressure sensor $108e$, and a sixth pressure sensor $108f$. The first pressure sensor $108a$ is associated with the first tank compartment $104a$. The first pressure sensor $108a$ outputs a signal indicative of a sensed pressure within the first tank compartment $104a$, which may be utilized to gauge the approximate level or amount of liquid in the first tank compartment $104a$. In some embodiments, the first pressure sensor $108a$ is positioned in the first tank compartment $104a$. In some embodiments, the first pressure sensor $108a$ is positioned in a pipe or conduit fluidly coupled to the first tank compartment $104a$, such as a pipe fluidly coupled to a bottom of the first tank compartment $104a$.

The second pressure sensor $108b$ is associated with the second tank compartment $104b$. The second pressure sensor $108b$ outputs a signal indicative of a sensed pressure within the second tank compartment $104b$, which may be utilized to gauge the approximate level or amount of liquid in the second tank compartment $104b$. In some embodiments, the second pressure sensor $108b$ is positioned in the second tank compartment $104b$. In some embodiments, the second pressure sensor $108b$ is positioned in a pipe or conduit fluidly coupled to the second tank compartment $104b$, such as a pipe fluidly coupled to a bottom of the second tank compartment $104b$.

The third pressure sensor $108c$ is associated with the third tank compartment $104c$. The third pressure sensor $108c$ outputs a signal indicative of a sensed pressure within the third tank compartment $104c$, which may be utilized to gauge the approximate level or amount of liquid in the third tank compartment $104c$. In some embodiments, the third pressure sensor $108c$ is positioned in the third tank compartment $104c$. In some embodiments, the third pressure sensor $108c$ is positioned in a pipe or conduit fluidly coupled to the third tank compartment $104c$, such as a pipe fluidly coupled to a bottom of the third tank compartment $104c$.

The fourth pressure sensor $108d$ is associated with the fourth tank compartment $104d$. The fourth pressure sensor $108d$ outputs a signal indicative of a sensed pressure within the fourth tank compartment $104d$, which may be utilized to gauge the approximate level or amount of liquid in the fourth tank compartment $104d$. In some embodiments, the fourth pressure sensor $108d$ is positioned in the fourth tank compartment $104d$. In some embodiments, the fourth pressure sensor $108d$ is positioned in a pipe or conduit fluidly coupled to the fourth tank compartment $104d$, such as a pipe fluidly coupled to a bottom of the fourth tank compartment $104d$.

The fifth pressure sensor $108e$ is associated with the fifth tank compartment $104e$. The fifth pressure sensor $108e$ outputs a signal indicative of a sensed pressure within the fifth tank compartment $104e$, which may be utilized to gauge the approximate level or amount of liquid in the fifth tank compartment $104e$. In some embodiments, the fifth pressure sensor $108e$ is positioned in the fifth tank compartment $104e$. In some embodiments, the fifth pressure sensor $108e$ is positioned in a pipe or conduit fluidly coupled to the fifth tank compartment $104e$, such as a pipe fluidly coupled to a bottom of the fifth tank compartment $104e$.

The sixth pressure sensor $108f$ is associated with the sixth tank compartment $104f$. The sixth pressure sensor $108f$ outputs a signal indicative of a sensed pressure within the sixth tank compartment $104f$, which may be utilized to gauge the approximate level or amount of liquid in the sixth tank compartment $104f$. In some embodiments, the sixth pressure sensor $108f$ is positioned in the sixth tank compartment $104f$. In some embodiments, the sixth pressure sensor $108f$ is positioned in a pipe or conduit fluidly coupled to the sixth tank compartment $104f$, such as a pipe fluidly coupled to a bottom of the sixth tank compartment $104f$.

In some embodiments, one or more of the plurality of pressure sensors $108a, \ldots, 108f$ may be a pressure sensor as described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference. In some embodiments, one or more of the plurality of pressure sensors $108a, \ldots, 108f$ is a diaphragm pressure sensor, model number 1E/F by Televac. However, it should be understood that alternative pressure sensors may be used, such as, for example, a piezo pressure sensor or an electric pressure sensor.

Still referring to FIG. 1, the plurality of control valves $110a, \ldots, 110f$ includes a first control valve $110a$, a second control valve $110b$, a third control valve $110c$, a fourth control valve $110d$, a fifth control valve $110e$, and a sixth control valve $110f$. The first control valve $110a$ is fluidly coupled to the first tank compartment $104a$ and controls the release of fluid from the first tank compartment $104a$, such that fluid may be released from the first tank compartment $104a$ when the first control valve $110a$ is in an open configuration and fluid may not be released from the first tank compartment $104a$ when the first control valve $110a$ is in a closed configuration. A first control valve sensor $112a$ outputs a signal indicative of a position or configuration of the first control valve $110a$, such as a signal indicative of the first control valve $110a$ being open or closed. The first control valve $110a$ may be opened and closed manually by an operator or automatically (e.g., when the first control valve $110a$ is pneumatically actuated).

The second control valve $110b$ is fluidly coupled to the second tank compartment $104b$ and controls the release of fluid from the second tank compartment $104b$, such that fluid may be released from the second tank compartment $104b$ when the second control valve $110b$ is in an open configuration and fluid may not be released from the second tank compartment $104b$ when the second control valve $110b$ is in a closed configuration. A second control valve sensor $112b$ outputs a signal indicative of a position or configuration of the second control valve $110b$, such as a signal indicative of the second control valve $110b$ being open or closed. The second control valve $110b$ may be opened and closed manually by an operator or automatically (e.g., when the second control valve $110b$ is pneumatically actuated).

The third control valve $110c$ is fluidly coupled to the third tank compartment $104c$ and controls the release of fluid from the third tank compartment $104c$, such that fluid may be released from the third tank compartment $104c$ when the third control valve $110c$ is in an open configuration and fluid may not be released from the third tank compartment $104c$ when the third control valve $110c$ is in a closed configuration. A third control valve sensor 112c outputs a signal indicative of a position or configuration of the third control valve 110c, such as a signal indicative of the third control valve 110c being open or closed. The third control valve 110c may be opened and closed manually by an operator or automatically (e.g., when the third control valve 110c is pneumatically actuated).

The fourth control valve 110d is fluidly coupled to the fourth tank compartment 104d and controls the release of fluid from the fourth tank compartment 104d, such that fluid may be released from the fourth tank compartment 104d when the fourth control valve 110d is in an open configuration and fluid may not be released from the fourth tank compartment 104d when the fourth control valve 110d is in a closed configuration. A fourth control valve sensor 112d outputs a signal indicative of a position or configuration of the fourth control valve 110d, such as a signal indicative of the fourth control valve 110d being open or closed. The fourth control valve 110d may be opened and closed manually by an operator or automatically (e.g., when the fourth control valve 110d is pneumatically actuated).

The fifth control valve 110e is fluidly coupled to the fifth tank compartment 104e and controls the release of fluid from the fifth tank compartment 104e, such that fluid may be released from the fifth tank compartment 104e when the fifth control valve 110e is in an open configuration and fluid may not be released from the fifth tank compartment 104e when the fifth control valve 110e is in a closed configuration. A fifth control valve sensor 112e outputs a signal indicative of a position or configuration of the fifth control valve 110e, such as a signal indicative of the fifth control valve 110e being open or closed. The fifth control valve 110e may be opened and closed manually by an operator or automatically (e.g., when the fifth control valve 110e is pneumatically actuated).

The sixth control valve 110f is fluidly coupled to the sixth tank compartment 104f and controls the release of fluid from the sixth tank compartment 104f, such that fluid may be released from the sixth tank compartment 104f when the sixth control valve 110f is in an open configuration and fluid may not be released from the sixth tank compartment 104f when the sixth control valve 110f is in a closed configuration. A sixth control valve sensor 112f outputs a signal indicative of a position or configuration of the sixth control valve 110f, such as a signal indicative of the sixth control valve 110f being open or closed. The sixth control valve 110f may be opened and closed manually by an operator or automatically (e.g., when the sixth control valve 110f is pneumatically actuated).

In some embodiments, one or more of the plurality of control valves 110a, . . . , 110f may be a control valve as described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference. In some embodiments, one or more of the plurality of control valves 110a, . . . , 110f is an API Adaptor, model number 891BA-LK by Civacon, though embodiments are not limited thereto. In some embodiments, one or more of the plurality of control valves 110a, . . . , 110f is an emergency valve, such as one of the MaxAir series of internal valves by Civacon.

Still referring to FIG. 1, the plurality of hose tag readers 114a, . . . , 114f includes a first hose tag reader 114a, a second hose tag reader 114b, a third hose tag reader 114c, a fourth hose tag reader 114d, a fifth hose tag reader 114e, and a sixth hose tag reader 114f. The first hose tag reader 114a is associated with the first tank compartment 104a and is an RFID tag reader operable to read an RFID tag on an input-end of a delivery hose when the delivery hose is mechanically connected to a connection point on the product delivery vehicle 102 that is in fluid communication with the first tank compartment 104a. The second hose tag reader 114b is associated with the second tank compartment 104b and is an RFID tag reader operable to read an RFID tag on an input-end of a delivery hose when the delivery hose is mechanically connected to a connection point on the product delivery vehicle 102 that is in fluid communication with the second tank compartment 104b. The third hose tag reader 114c is associated with the third tank compartment 104c and is an RFID tag reader operable to read an RFID tag on an input-end of a delivery hose when the delivery hose is mechanically connected to a connection point on the product delivery vehicle 102 that is in fluid communication with the third tank compartment 104c. The fourth hose tag reader 114d is associated with the fourth tank compartment 104d and is an RFID tag reader operable to read an RFID tag on an input-end of a delivery hose when the delivery hose is mechanically connected to a connection point on the product delivery vehicle 102 that is in fluid communication with the fourth tank compartment 104d. The fifth hose tag reader 114e is associated with the fifth tank compartment 104e and is an RFID tag reader operable to read an RFID tag on an input-end of a delivery hose when the delivery hose is mechanically connected to a connection point on the product delivery vehicle 102 that is in fluid communication with the fifth tank compartment 104e. The sixth hose tag reader 114f is associated with the sixth tank compartment 104f and is an RFID tag reader operable to read an RFID tag on an input-end of a delivery hose when the delivery hose is mechanically connected to a connection point on the product delivery vehicle 102 that is in fluid communication with the sixth tank compartment 104f.

In some embodiments, one or more of the plurality of hose tag readers 114a, . . . , 114f may be a hose tag reader as described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference, though embodiments are note limited thereto.

Still referring to FIG. 1, the plurality of solenoid valves 120a, . . . , 120f includes a first solenoid valve 120a, a second solenoid valve 120b, a third solenoid valve 120c, a fourth solenoid valve 120d, a fifth solenoid valve 120e, and a sixth solenoid valve 120f. In some embodiments, each of the plurality of solenoid valves 120a, . . . , 120f is a pneumatic solenoid valve operable to actuate a valve associated with a corresponding tank compartment. The first solenoid valve 120a is associated with the first tank compartment 104a and controls the actuation of a valve associated with the first tank compartment 104a, such as an emergency valve associated with the first tank compartment 104a, the first control valve 110a, or another valve associated with the first tank compartment 104a. A first solenoid valve sensor 122a outputs a signal indicative of a position or configuration of the first solenoid valve 120a, such as a signal indicative of the first solenoid valve 120a being open or closed.

The second solenoid valve 120b is associated with the second tank compartment 104b and controls the actuation of a valve associated with the second tank compartment 104b, such as an emergency valve associated with the second tank compartment 104b, the second control valve 110b, or another valve associated with the second tank compartment 104b. A second solenoid valve sensor 122b outputs a signal indicative of a position or configuration of the second solenoid valve 120b, such as a signal indicative of the second solenoid valve 120b being open or closed.

The third solenoid valve 120c is associated with the third tank compartment 104c and controls the actuation of a valve associated with the third tank compartment 104c, such as an emergency valve associated with the third tank compartment 104c, the third control valve 110c, or another valve associated with the third tank compartment 104c. A third solenoid valve sensor 122c outputs a signal indicative of a position or configuration of the third solenoid valve 120c, such as a signal indicative of the third solenoid valve 120c being open or closed.

The fourth solenoid valve 120d is associated with the fourth tank compartment 104d and controls the actuation of a valve associated with the fourth tank compartment 104d, such as an emergency valve associated with the fourth tank compartment 104d, the fourth control valve 110d, or another valve associated with the fourth tank compartment 104d. A fourth solenoid valve sensor 122d outputs a signal indicative of a position or configuration of the fourth solenoid valve 120d, such as a signal indicative of the fourth solenoid valve 120d being open or closed.

The fifth solenoid valve 120e is associated with the fifth tank compartment 104e and controls the actuation of a valve associated with the fifth tank compartment 104e, such as an emergency valve associated with the fifth tank compartment 104e, the fifth control valve 110e, or another valve associated with the fifth tank compartment 104e. A fifth solenoid valve sensor 122e outputs a signal indicative of a position or configuration of the fifth solenoid valve 120e, such as a signal indicative of the fifth solenoid valve 120e being open or closed.

The sixth solenoid valve 120f is associated with the sixth tank compartment 104f and controls the actuation of a valve associated with the sixth tank compartment 104f, such as an emergency valve associated with the sixth tank compartment 104f, the sixth control valve 110f, or another valve associated with the sixth tank compartment 104f. A sixth solenoid valve sensor 122f outputs a signal indicative of a position or configuration of the sixth solenoid valve 120f, such as a signal indicative of the sixth solenoid valve 120f being open or closed.

In some embodiments, one or more of the plurality of solenoid valves 120a, . . . , 120f may be a solenoid valve or solenoid valve assembly as described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference, though embodiments are not limited thereto.

Still referring to FIG. 1, the first delivery hose 190a includes a first input-end hose tag 192a at an input end of the first delivery hose 190a and a first output-end hose tag 194a at an output end of the first delivery hose 190a. In some embodiments, the input end of the first delivery hose 190a is configured to be mechanically connected to an interface of the product delivery vehicle 102 that is in fluid communication with a tank compartment from which fluid is to be delivered to a distribution tank. The first input-end hose tag 192a may be read by a hose tag reader (e.g., any of the plurality of hose tag readers 114a, . . . , 114o) coupled to the product delivery vehicle 102 in the vicinity of the mechanical connection of the first delivery hose 190a to the product delivery vehicle 102. The output end of the first delivery hose 190a is configured to be mechanically connected to a tank delivery connector, which in turn is mechanically connected to an inlet of a distribution tank. The first output-end hose tag 194a may be read by a hose tag reader coupled to the tank delivery connector in the vicinity of the mechanical connection of the first delivery hose 190a to the tank delivery connector. The first delivery hose 190a may be mechanically coupled to the product delivery vehicle 102 and fluidly coupled to a distribution tank of the product delivery vehicle 102 in any manner, including any manner described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference.

Still referring to FIG. 1, the second delivery hose 190b includes a second input-end hose tag 192b at an input end of the second delivery hose 190b and a second output-end hose tag 194b at an output end of the second delivery hose 190b. In some embodiments, the input end of the second delivery hose 190b is configured to be mechanically connected to an interface of the product delivery vehicle 102 that is in fluid communication with a tank compartment from which fluid is to be delivered to a distribution tank. The second input-end hose tag 192b may be read by a hose tag reader (e.g., any of the plurality of hose tag readers 114a, . . . , 114o) coupled to the product delivery vehicle 102 in the vicinity of the mechanical connection of the second delivery hose 190b to the product delivery vehicle 102. The output end of the second delivery hose 190b is configured to be mechanically connected to a tank delivery connector, which in turn is mechanically connected to an inlet of a distribution tank. The second output-end hose tag 194b may be read by a hose tag reader coupled to the tank delivery connector in the vicinity of the mechanical connection of the second delivery hose 190b to the tank delivery connector. The second delivery hose 190b may be mechanically coupled to the product delivery vehicle 102 and fluidly coupled to a distribution tank of the product delivery vehicle 102 in any manner, including any manner described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference.

Still referring to FIG. 1, the first distribution tank 170a includes a first inlet 172a and a first tank tag 174a. In some embodiments, the first tank tag 174a is an RFID tag that includes an identifier of a liquid stored in the first distribution tank 170a. In some embodiments, the first tank tag 174a may be mechanically coupled to the first inlet 172a. In some embodiments, the first tank tag 174a may be placed in the vicinity of the first inlet 172a such that when a tank delivery connector is mechanically coupled to the first inlet 172a, a corresponding tag reader of the tank delivery connector can read the first tank tag 174a. Similarly, the second distribution tank 170b includes a second inlet 172b and a second tank tag 174b. In some embodiments, the second tank tag 174b is an RFID tag that includes an identifier of a liquid stored in the second distribution tank 170b. In some embodiments, the second tank tag 174b may be mechanically coupled to the second inlet 172b. In some embodiments, the second tank tag 174b may be placed in the vicinity of the second inlet 172b such that when a tank delivery connector is mechanically coupled to the second inlet 172*b*, a corresponding tag reader of the tank delivery connector can read the second tank tag 174*b*.

Still referring to FIG. 1, the first tank delivery connector 150*a* includes a first locking lever 151*a*, a first tank tag reader 152*a*, and a first hose tag reader 153*a*. The first locking lever 151*a* is configured to mechanically secure the first tank delivery connector 150*a* to an inlet of a distribution tank when the first locking lever 151*a* is in a locked configuration, such that fluid may flow through the first tank delivery connector 150*a* and into the distribution tank. The first tank tag reader 152*a* is configured to read a tank tag in the vicinity of the inlet of a distribution tank to which the first tank delivery connector 150*a* is coupled. In some embodiments, the first tank tag reader 152*a* is an RFID tag reader, such as in embodiments in which the tank tag is an RFID tag. The first hose tag reader 153*a* is an RFID tag reader operable to read an RFID tag on an output-end of a delivery hose when the delivery hose is mechanically connected to the first tank delivery connector 150*a*. In some embodiments, the first tank delivery connector 150*a* includes one or more components of the tank delivery connectors described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference. In some embodiments, the first tank delivery connector 150*a* includes the same mechanical interface components and is configured to be mechanically coupled to the first delivery hose 190*a* or the second delivery hose 190*b* and/or is configured to be mechanically coupled to the first distribution tank 170*a* or the second distribution tank 170*b* in the manner described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference.

Still referring to FIG. 1, the second tank delivery connector 150*b* includes a second locking lever 151*b*, a second tank tag reader 152*b*, and a second hose tag reader 153*b*. The second locking lever 151*b* is configured to mechanically secure the second tank delivery connector 150*b* to an inlet of a distribution tank when the second locking lever 151*b* is in a locked configuration, such that fluid may flow through the second tank delivery connector 150*b* and into the distribution tank. The second tank tag reader 152*b* is configured to read a tank tag in the vicinity of the inlet of a distribution tank to which the second tank delivery connector 150*b* is coupled. In some embodiments, the second tank tag reader 152*b* is an RFID tag reader, such as in embodiments in which the tank tag is an RFID tag. The second hose tag reader 153*b* is an RFID tag reader operable to read an RFID tag on an output-end of a delivery hose when the delivery hose is mechanically connected to the second tank delivery connector 150*b*. In some embodiments, the second tank delivery connector 150*b* includes one or more components of the tank delivery connectors described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference. In some embodiments, the second tank delivery connector 150*b* includes the same mechanical interface components and is configured to be mechanically coupled to the first delivery hose 190*a* or the second delivery hose 190*b* and/or is configured to be mechanically coupled to the first distribution tank 170*a* or the second distribution tank 170*b* in the manner described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference.

Figure 2:
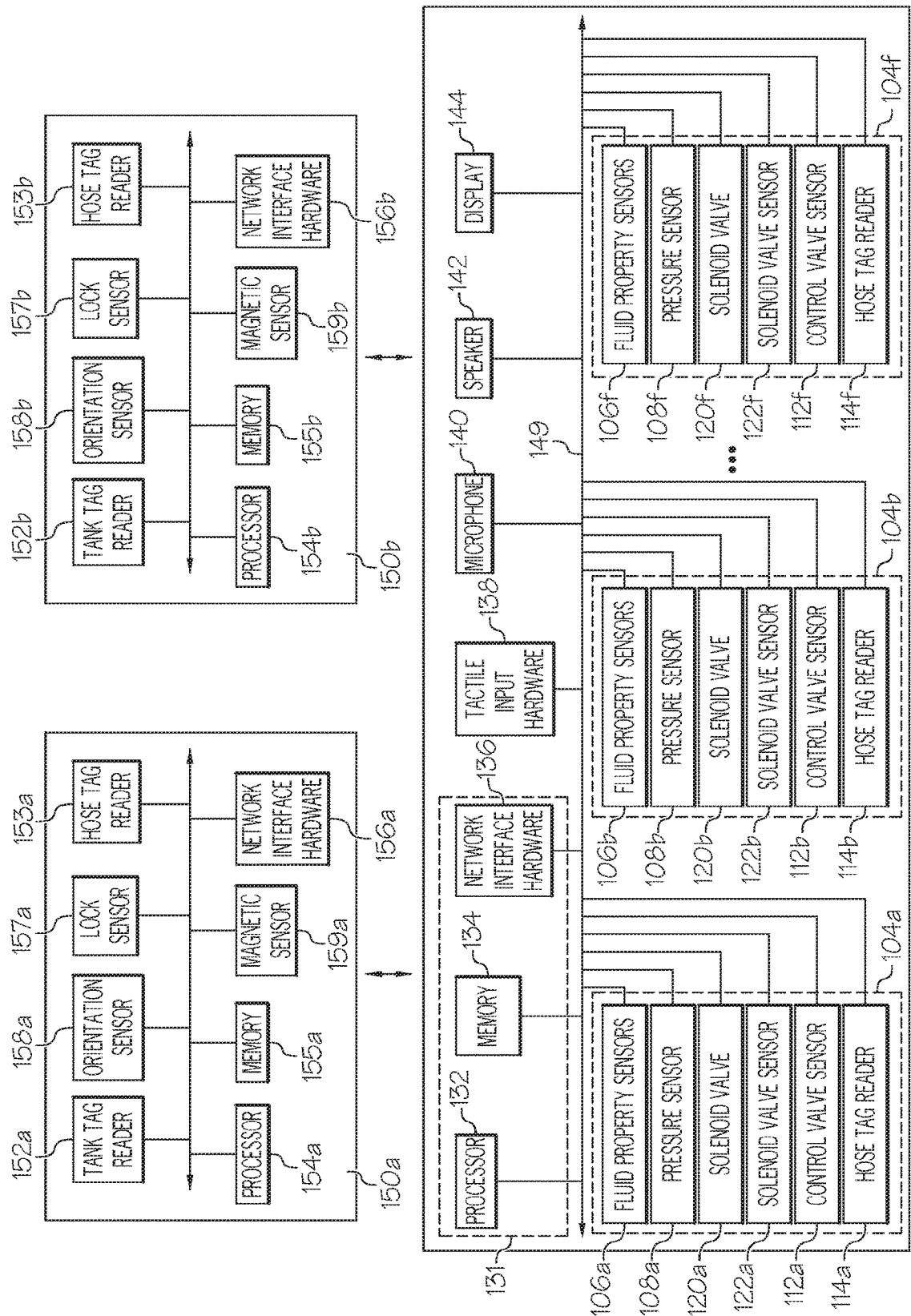
FIG. 2 schematically depicts various electronic components of a product delivery vehicle system, a first tank delivery connector, and a second tank delivery connector, according to one or more embodiments of the present disclosure.

Referring now to FIG. 2, a product delivery vehicle system 130 communicatively coupled to the first tank delivery connector 150*a* and the second tank delivery connector 150*b* is schematically depicted. The product delivery vehicle system 130 includes an electronic control unit 131 (which includes a processor 132, a memory module 134, and network interface hardware 136), tactile input hardware 138, a microphone 140, a speaker 142, a display 144, a communication path 149, the plurality of fluid property sensors 106*a*, . . . , 106*f*, the plurality of pressure sensors 108*a*, . . . , 108*f*, the plurality of control valve sensors 112*a*, . . . , 112*f*, the plurality of hose tag readers 114*a*, . . . , 114*f*, the plurality of solenoid valves 120*a*, . . . , 120*f*, and the plurality of solenoid valve sensors 122*a*, . . . , 122*f*.

Still referring to FIG. 2, the communication path 149 may be formed from any medium that is capable of transmitting a signal such as, for example, conductive wires, conductive traces, optical waveguides, or the like. Moreover, the communication path 149 may be formed from a combination of mediums capable of transmitting signals. In one embodiment, the communication path 149 comprises a combination of conductive traces, conductive wires, connectors, and buses that cooperate to permit the transmission of electrical data signals to components such as processors, memories, sensors, input devices, output devices, and communication devices. Accordingly, the communication path 149 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 149 communicatively couples the various components of the product delivery vehicle system 130, including the electronic control unit 131 (which includes the processor 132, the memory module 134, and the network interface hardware 136), the tactile input hardware 138, the microphone 140, the speaker 142, the display 144, the communication path 149, the plurality of fluid property sensors 106*a*, . . . , 106*f*, the plurality of pressure sensors 108*a*, . . . , 108*f*, the plurality of control valve sensors 112*a*, . . . , 112*f*, the plurality of hose tag readers 114*a*, . . . , 114*f*, the plurality of solenoid valves 120*a*, . . . , 120*f*, and the plurality of solenoid valve sensors 122*a*, . . . , 122*f*. As used herein, the term "communicatively coupled" means that coupled components are capable of exchanging data signals with one another such as, for example, electrical signals via conductive medium, electromagnetic signals via air, optical signals via optical waveguides, and the like.

Still referring to FIG. 2, the processor 132 may be any device capable of executing machine readable instructions. Accordingly, the processor 132 may be a controller, an integrated circuit, a microchip, a computer, or any other computing device. The processor 132 is communicatively coupled to the other components of the product delivery vehicle system 130 by the communication path 149. While FIG. 2 shows one processor 132, in other embodiments, multiple processors may be communicatively coupled by the communication path 149 and allows multiple processors to operate in a distributed computing environment.

Still referring to FIG. 2, the memory module 134 is coupled to the communication path 149 and communicatively coupled to the processor 132. The memory module 134 may comprise RAM, ROM, flash memories, hard drives, or any device capable of storing machine readable instructions such that the machine readable instructions can be accessed and executed by the processor 132. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the memory module 134. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, the display 144 is coupled to the communication path 149 and communicatively coupled to the processor 132. The display 144 may be any device capable of providing visual output such as, for example, a schematic representation of the product delivery vehicle 102 and information pertaining to unloading fluid therefrom, as will be described below. The display 144 may include any medium capable of transmitting an optical output such as, for example, a cathode ray tube, light emitting diodes, a liquid crystal display, a plasma display, or the like. Moreover, the display 144 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 108 can include one or more processors and the one or memory modules.

Still referring to FIG. 2, the tactile input hardware 138 is coupled to the communication path 149 and communicatively coupled to the processor 132. The tactile input hardware 138 may be any device capable of transforming mechanical, optical, or electrical signals into a data signal capable of being transmitted with the communication path 149. Specifically, the tactile input hardware 138 may include any number of movable objects that each transform physical motion into a data signal that can be transmitted to over the communication path 104 such as, for example, a button, a switch, a knob, or the like. In some embodiments, the display 144 and the tactile input hardware 138 are combined as a single module and operate as a touchscreen. However, it is noted, that the display 144 and the tactile input hardware 138 may be separate from one another and operate as a single module by exchanging signals via the communication path 149.

Still referring to FIG. 2, the speaker 142 is coupled to the communication path 149 and communicatively coupled to the processor 132. The speaker 142 transforms data signals into mechanical vibrations, such as in order to provide information related to operation of the product delivery vehicle system 130. However, it should be understood that in other embodiments the product delivery vehicle system 130 may not include the speaker 142.

Still referring to FIG. 2, the microphone 140 is coupled to the communication path 149 and communicatively coupled to the processor 132. The microphone 140 may be any device capable of receiving a mechanical vibration at the microphone and transforming the received mechanical vibration into an electrical signal indicative of the received mechanical vibration. The microphone 140 may provide another way for a user to provide input to the product delivery vehicle system 130.

Still referring to FIG. 2, network interface hardware 136 is coupled to the communication path 149 and communicatively coupled to the processor 132. The network interface hardware may be any device capable of transmitting and/or receiving data via a network. Accordingly, the network interface hardware 136 can include a communication transceiver for sending and/or receiving any wired or wireless communication. For example, the network interface hardware 136 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, network interface hardware 136 includes a wireless communication module configured to send and receive wireless communication with other devices. In some embodiments, network interface hardware 136 communicates wirelessly according to the IrDA, Bluetooth, Wireless USB, Z-Wave, ZigBee, and/or any other wireless communication protocols.

Still referring to FIG. 2, the first tank delivery connector 150a includes a first tank tag reader 152a, a first hose tag reader 153a, a first processor 154a, a first memory module 155a, first network interface hardware 156a, a first lock sensor 157a, a first orientation sensor 158a, a first magnetic sensor 159a, and a first communication path 160a.

Still referring to FIG. 2, the first communication path 160a may be formed from any medium that is capable of transmitting a signal such as, for example, conductive wires, conductive traces, optical waveguides, or the like. Moreover, the first communication path 160a may be formed from a combination of mediums capable of transmitting signals. In one embodiment, the first communication path 160a comprises a combination of conductive traces, conductive wires, connectors, and buses that cooperate to permit the transmission of electrical data signals to components such as processors, memories, sensors, input devices, output devices, and communication devices The first communication path 160a communicatively couples the various components of the first tank delivery connector 150a, including the first tank tag reader 152a, the first hose tag reader 153a, the first processor 154a, the first memory module 155a, first network interface hardware 156a, the first lock sensor 157a, the first orientation sensor 158a, and the first magnetic sensor 159a.

Still referring to FIG. 2, the first processor 154a may be any device capable of executing machine readable instructions. Accordingly, the first processor 154a may be a controller, an integrated circuit, a microchip, a computer, or any other computing device. The first processor 154a is communicatively coupled to the other components of the first tank delivery connector 150a by the first communication path 160a. While FIG. 2 shows one first processor 154a, in other embodiments, multiple processors may be communicatively coupled by the first communication path 160a and allows multiple processors to operate in a distributed computing environment.

Still referring to FIG. 2, the first memory module 155a is coupled to the first communication path 160a and communicatively coupled to the first processor 154a. The first memory module 155a may comprise RAM, ROM, flash memories, hard drives, or any device capable of storing machine readable instructions such that the machine readable instructions can be accessed and executed by the first processor 154a. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the first memory module 155a. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, first network interface hardware 156a is coupled to the first communication path 160a and communicatively coupled to the first processor 154a. The network interface hardware may be any device capable of transmitting and/or receiving data via a network. Accordingly, the first network interface hardware 156a can include a communication transceiver for sending and/or receiving any wired or wireless communication. For example, the first network interface hardware 156a may include an antenna, a modem, LAN port, Wi-Fi card, WiMax card, mobile communications hardware, near-field communication hardware, satellite communication hardware and/or any wired or wireless hardware for communicating with other networks and/or devices, such as the product delivery vehicle system 130. In some embodiments, first network interface hardware 156a includes a wireless communication module configured to send and receive wireless communication with other devices, such as the product delivery vehicle system 130. In some embodiments, first network interface hardware 156a communicates wirelessly according to the IrDA, Bluetooth, Wireless USB, Z-Wave, ZigBee, and/or any other wireless communication protocols.

Still referring to FIG. 2, the first tank tag reader 152a and the first hose tag reader 153a are coupled to the first communication path 160a and communicatively coupled to the first processor 154a. The first tank tag reader 152a is a tank tag reader configured to read a tank tag of a distribution tank when the first tank tag reader 152a is positioned sufficiently near the tank tag. Similarly, the first hose tag reader 153a is a hose tag reader configured to read a tag of a delivery hose when the first hose tag reader 153a is positioned sufficiently near the hose tag. In some embodiments each of the first tank tag reader 152a and the first hose tag reader 153a are RFID tag readers configured to read an RFID tag within the range of the reader. In some embodiments, the first tank tag reader 152a and/or the first hose tag reader 153a may be tag readers other than RFID tag readers, such as in embodiments in which the tank tag and/or the hose tag are tags other than RFID tags.

Still referring to FIG. 2, the first lock sensor 157a is coupled to the first communication path 160a and communicatively coupled to the first processor 154a. The first lock sensor 157a outputs a signal indicative of a position or configuration of the first locking lever 151a (FIG. 1) of the first tank delivery connector 150a, such as a signal indicative of the first locking lever 151a being in a locked configuration or in an unlocked configuration.

Still referring to FIG. 2, the first orientation sensor 158a is coupled to the first communication path 160a and communicatively coupled to the first processor 154a. The first orientation sensor 158a outputs a signal indicative of an orientation of the first tank delivery connector 150a (e.g., whether upright, horizontal, etc.) In some embodiments, the first orientation sensor 158a is an inertial measurement unit, an accelerometer, or a gyroscope.

Still referring to FIG. 2, the first magnetic sensor 159a is coupled to the first communication path 160a and communicatively coupled to the first processor 154a. The first magnetic sensor 159a outputs a signal indicative of a strength of a magnetic field in which the first magnetic sensor 159a is positioned. In some embodiments, the first magnetic sensor 159a is a hall effect sensor, though embodiments are not limited thereto.

Still referring to FIG. 2, the second tank delivery connector 150b includes a second tank tag reader 152b, a second hose tag reader 153b, a second processor 154b, a second memory module 155b, second network interface hardware 156b, a second lock sensor 157b, a second orientation sensor 158b, a second magnetic sensor 159b, and a second communication path 160b. In some embodiments, the second tank tag reader 152b, the second hose tag reader 153b, the second processor 154b, the second memory module 155b, second network interface hardware 156b, the second lock sensor 157b, the second orientation sensor 158b, the second magnetic sensor 159b, and the second communication path 160b are the same as the first tank tag reader 152a, the first hose tag reader 153a, the first processor 154a, the first memory module 155a, first network interface hardware 156a, the first lock sensor 157a, the first orientation sensor 158a, the first magnetic sensor 159a, and the first communication path 160a of the first tank delivery connector 150a, respectively and are interconnected in the same way as the components of the first tank delivery connector 150a.

Having described the various system components, the various graphical user interfaces displayed on the display 144 during various system operations. While the below description is provided with respect to a product delivery vehicle that carries fuel in a plurality of tank compartments of the product delivery, the graphical user interfaces described below would be equally applicable to a product delivery vehicle that carries liquids other than fuel.

Figure 3:
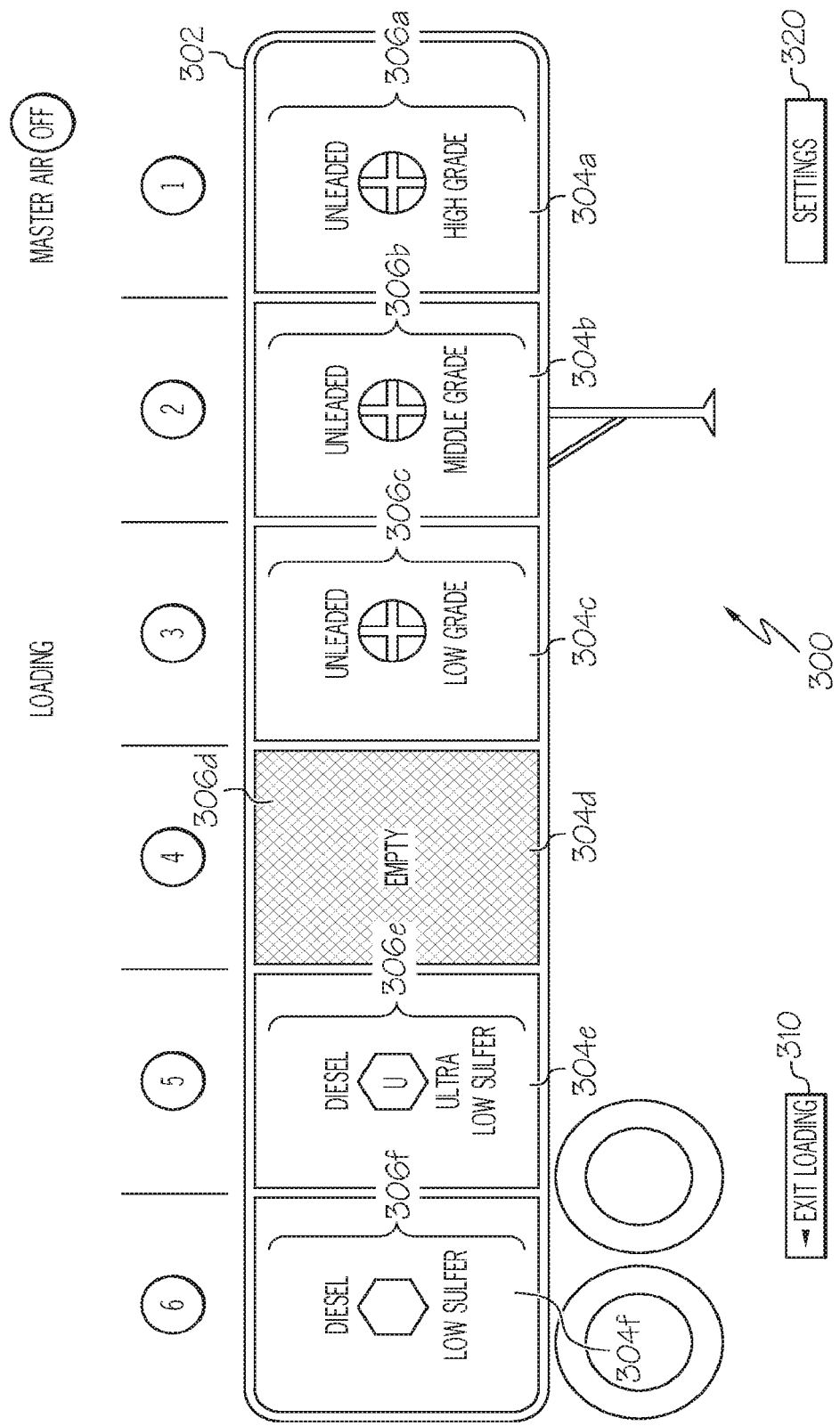
FIG. 3 schematically depicts a loading graphical user interface, according to one or more embodiments of the present disclosure.

Referring now to FIG. 3 in conjunction with FIGS. 1-2, a crossover protection system graphical user interface 300 that is displayed on the display 144 is depicted. In some embodiments, the graphical user interface 300 is displayed when the product delivery vehicle system 130 powers on. In other embodiments, the graphical user interface 300 may be displayed in response to receiving user input indicative of a desire to enter a loading mode (e.g., when a loading button is displayed on the display 144 and a signal indicative of a selection of the loading button is received from the tactile input hardware 138, from the display 144 (when the display 144 is a touchscreen), from the microphone 140, or the like). In some embodiments, the graphical user interface 300 may be displayed in response to detecting the presence of a socket or other component that interfaces with the product delivery vehicle 102 when the product delivery vehicle 102 is at a loading depot. The graphical user interface 300 may be displayed during a loading mode in which the product delivery vehicle system 130 sets the liquid type in each of the plurality of tank compartments 104a, . . . , 104f of the product delivery vehicle 102. The graphical user interface 300 includes a schematic representation of the product delivery vehicle 302, an exit loading button 310, and a settings button 320.

Still referring to FIG. 3 in conjunction with FIGS. 1-2, the schematic representation of the product delivery vehicle 302 includes a plurality of tank compartment graphics, including a first tank compartment graphic 304a, a second tank compartment graphic 304b, a third tank compartment graphic 304c, a fourth tank compartment graphic 304d, a fifth tank compartment graphic 304e, and a sixth tank compartment graphic 304f. Each tank compartment graphic is associated with a tank compartment of the product delivery vehicle 102 and depicts a graphical representation of the associated tank compartment. In particular, the first tank compartment graphic 304a is associated with the first tank compartment 104a and depicts a graphical representation of the first tank compartment 104a. The second tank compartment graphic 304b is associated with the second tank compartment 104b and depicts a graphical representation of the second tank compartment 104b. The third tank compartment graphic 304c is associated with the third tank compartment 104c and depicts a graphical representation of the third tank compartment 104c. The fourth tank compartment graphic 304d is associated with the fourth tank compartment 104d and depicts a graphical representation of the fourth tank compartment 104d. The fifth tank compartment graphic 304e is associated with the fifth tank compartment 104e and depicts a graphical representation of the fifth tank compartment 104e. The sixth tank compartment graphic 304f is associated with the sixth tank compartment 104f and depicts a graphical representation of the sixth tank compartment 104f.

Still referring to FIG. 3 in conjunction with FIGS. 1-2, a plurality of graphical indications of fuel type is schematically depicted. The plurality of graphical indications of fuel type includes a first graphical indication of fuel type 306a, a second graphical indication of fuel type 306b, a third graphical indication of fuel type 306c, a fourth graphical indication of fuel type 306d, a fifth graphical indication of fuel type 306e, and a sixth graphical indication of fuel type 306f. The first graphical indication of fuel type 306a is displayed proximate the first tank compartment graphic 304a, thereby indicating that the first tank compartment 104a includes a first fuel type indicated by the first graphical indication of fuel type 306a. The second graphical indication of fuel type 306b is displayed proximate the second tank compartment graphic 304b, thereby indicating that the second tank compartment 104b includes a second fuel type indicated by the second graphical indication of fuel type 306b. The third graphical indication of fuel type 306c is displayed proximate the third tank compartment graphic 304c, thereby indicating that the third tank compartment 104c includes a third fuel type indicated by the third graphical indication of fuel type 306c. The fourth graphical indication of fuel type 306d is displayed proximate the fourth tank compartment graphic 304d, thereby indicating that the fourth tank compartment 104d includes a fourth fuel type indicated by the fourth graphical indication of fuel type 306d. The fifth graphical indication of fuel type 306e is displayed proximate the fifth tank compartment graphic 304e, thereby indicating that the fifth tank compartment 104e includes a fifth fuel type indicated by the fifth graphical indication of fuel type 306e. The sixth graphical indication of fuel type 306f is displayed proximate the sixth tank compartment graphic 304f, thereby indicating that the sixth tank compartment 104f includes a sixth fuel type indicated by the sixth graphical indication of fuel type 306f. In the embodiment depicted in FIG. 3, the first graphical indication of fuel type 306a indicates that the first tank compartment 104a includes high grade unleaded gasoline, the second graphical indication of fuel type 306b indicates that the second tank compartment 104b includes middle grade unleaded gasoline, the third graphical indication of fuel type 306c indicates that the third tank compartment 104c includes low grade unleaded gasoline, the fourth graphical indication of fuel type 306d indicates that the fourth tank compartment 104d does not contain any fuel (i.e., is empty), the fifth graphical indication of fuel type 306e indicates that the fifth tank compartment 104e includes ultra low sulfur diesel, and the sixth graphical indication of fuel type 306f indicates that the sixth tank compartment 104f includes low sulfur diesel. Each of the plurality of graphical indications of fuel type may include text (e.g., the text "Ultra Low Sulfur," "Unleaded," "Mid Grade," "Low Grade," etc.). Each of the plurality of graphical indications of fuel type may include a symbol representative of the fuel grade (e.g., the "U" depicted inside a hexagon to depict ultra low sulfur diesel). Each of the plurality of graphical indications of fuel type may also be color coded according to fuel type, fuel category, fuel grade, or the like.

Figure 4:
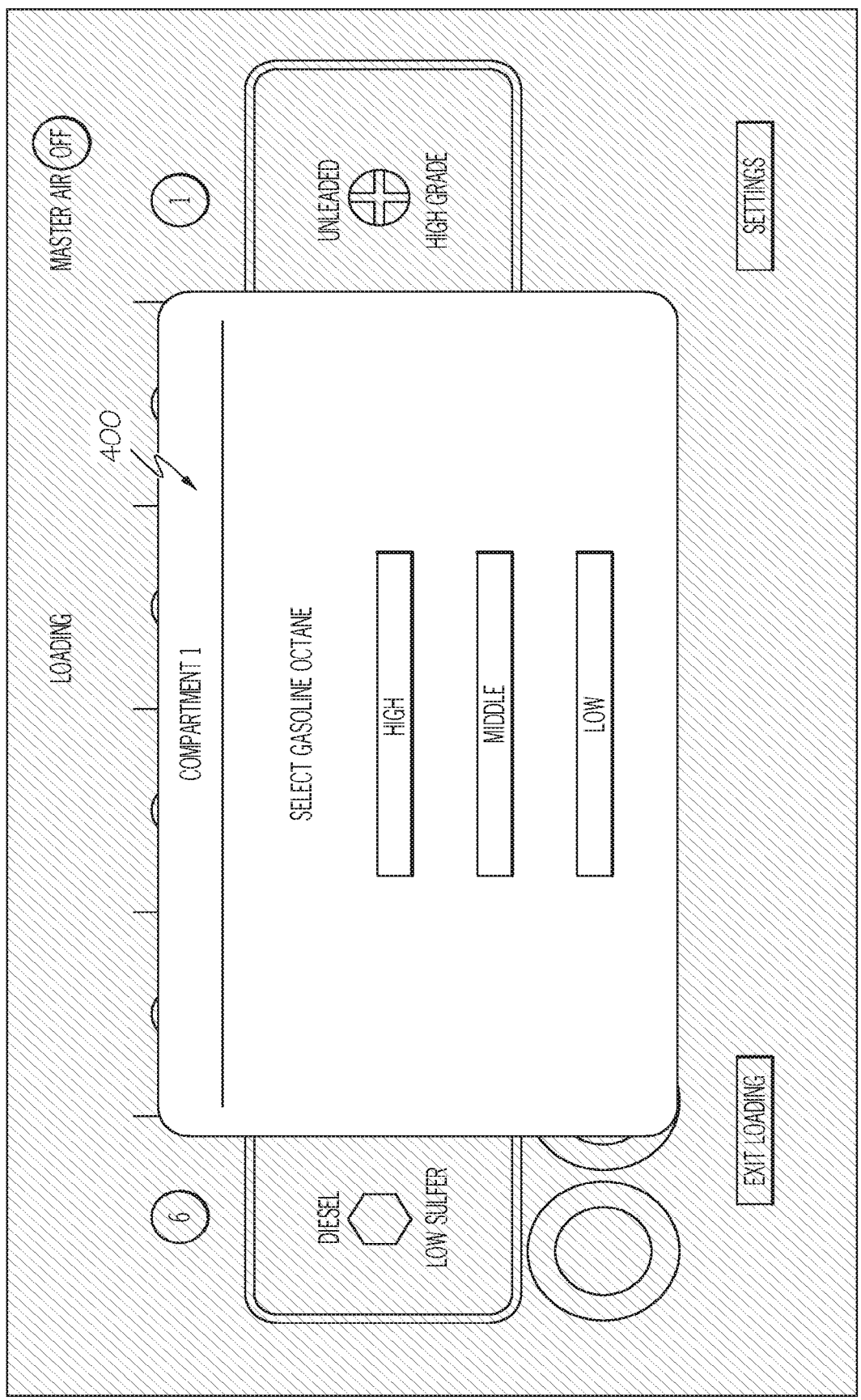
FIG. 4 schematically depicts a gasoline grade selection graphical user interface, according to one or more embodiments of the present disclosure.

Still referring to FIG. 3 in conjunction with FIGS. 1-2, in order to graphically indicate the fuel type included in each tank compartment of the product vehicle with the appropriate graphical indications of fuel type, the product delivery vehicle system 130 must first determine the fuel type included in each tank compartment. In some embodiments, the product delivery vehicle system 130 determines the fuel type in a particular tank compartment automatically based on a signal indicative of a sensed fluid property (e.g., a viscosity, a density, a dielectric constant, a temperature, etc.) output by one of the plurality of fluid property sensors 106a, . . . , 106f. For example, the fuel type in the first tank compartment 104a may be determined to be unleaded high grade gasoline based on a sensed fluid property signal output by the first fluid property sensor 106a, such as by using a look-up table or function to determine the fuel type associated with the sensed fluid property signal. In other embodiments, the user may manually input the fuel type included in one or more tank compartments. For example, in some embodiments, a user may provide input to the tactile input hardware 138 and/or the display 144 (in embodiments in which the display 144 is a touchscreen) indicative of a fuel type included in a particular tank compartment. For example, a user may provide user input via the tactile input hardware 138 and/or the display 144 (in embodiments in which the display 144 is a touchscreen) indicative that the second tank compartment 104b includes middle grade unleaded gasoline. In some embodiments, the system may detect that a particular category of fuel that is included in a particular tank compartment based on a sensed signal output by a fluid property sensor, and may then prompt the user to select a grade of the detected category of fuel. For example, the category of fuel in the third tank compartment 104c may be determined to be gasoline based on a sensed fluid property signal output by the third fluid property sensor 106c, such as by using a look-up table or function to determine the fuel type associated with the sensed fluid property signal. Referring to FIG. 4, the user may then be provided a graphical user interface 400 displayed on the display 144 that prompts the user to input the grade of gasoline. In response to the display of the graphical user interface 400, the user may provide input via the tactile input hardware 138 and/or the display 144 (in embodiments in which the display 144 is a touchscreen) indicative of the grade of gasoline. For example, the user may provide input indicating that the grade of gasoline is low and the system may set the fuel type of the third tank compartment 104*c* to be low grade unleaded gasoline based on both the sensed fluid property signal output by the third fluid property sensor 106*c* and the tactile input from the user indicative of the fuel grade.

In some embodiments, the fuel type may be determined as empty based on a signal output by one of the plurality of pressure sensors 108*a*, . . . , 108*f*. For example, the product delivery vehicle system 130 may determine that the fourth tank compartment 104*d* is empty based on an output signal from the fourth pressure sensor 108*d*.

Figure 5:
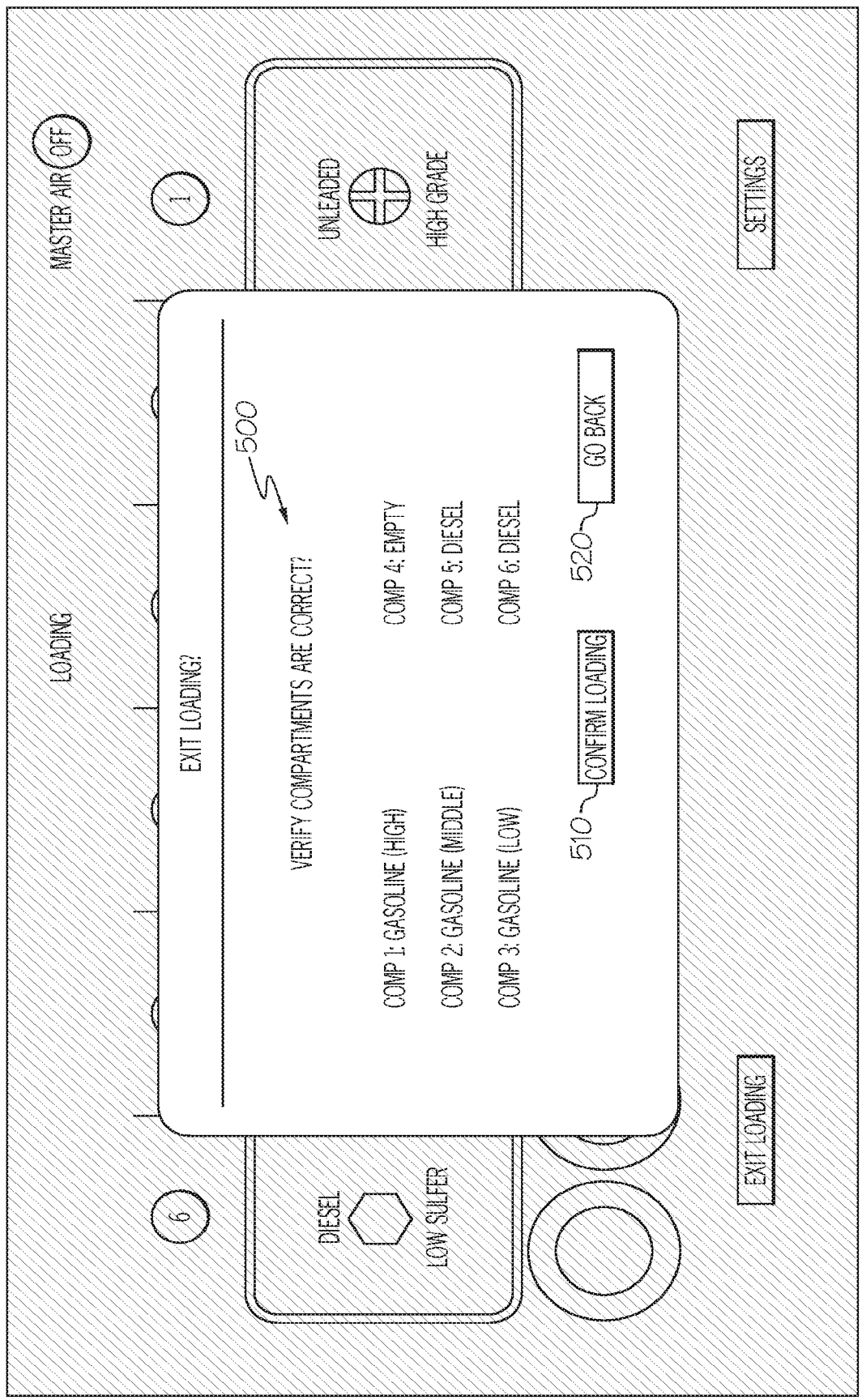
FIG. 5 schematically depicts a compartment verification graphical user interface, according to one or more embodiments of the present disclosure.

Referring once again to FIG. 3 in conjunction with FIGS. 1-2, the exit loading button 310 may allow a user to exit a loading mode, such as when a signal indicative of a selection of the exit loading button 310 is received from the tactile input hardware 138, from the display 144 (when the display 144 is a touchscreen), from the microphone 140, or the like. In response to the user selecting the exit loading button 310, the display 144 may change from displaying the graphical user interface 300 to displaying a main graphical user interface. In some embodiments, upon the user selecting the exit loading button 310, the user may be presented with a confirmation screen on the display 144, such as the graphical user interface 500 depicted in FIG. 5. The graphical user interface 500 includes a graphical indication listing the fuel type associated with each tank compartment of the product delivery vehicle 102, a confirm loading button 510, and a go back button 520. If the user determines that the displayed information is correct, the user may select the confirm loading button 510, which may cause the display 144 to display a main graphical user interface. If the user determines that the displayed information is incorrect, the user may select the go back button 520 to return to the graphical user interface 300 to correct any incorrect information, such as by providing manual input to change the incorrect fuel types.

Figure 6:
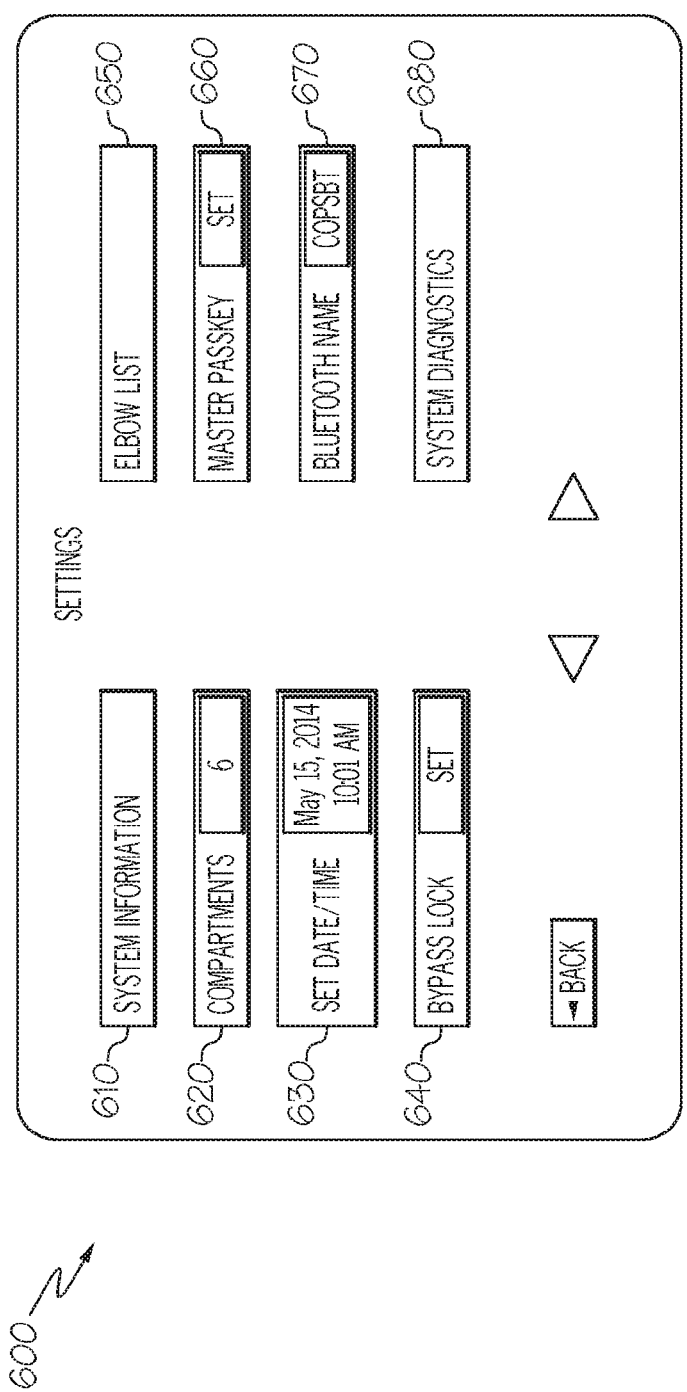
FIG. 6 schematically depicts a settings graphical user interface, according to one or more embodiments of the present disclosure.

Referring once again to FIG. 3 in conjunction with FIGS. 1-2, the settings button 320 may allow a user to view a settings graphical user interface, such as when a signal indicative of a selection of the settings button 320 is received from the tactile input hardware 138, from the display 144 (when the display 144 is a touchscreen), from the microphone 140, or the like. FIG. 6 shows one embodiment of a settings graphical user interface 600 that may be displayed on the display 144. In some embodiments, the settings graphical user interface 600 may allow a user to view various system information and set various system settings, such as to view general system information (e.g. by selecting button 610), to set a number of tank compartments on the product delivery vehicle 102 (e.g. by selecting button 620), to set a date and time (e.g. by selecting button 630), to set a bypass lock (e.g. by selecting button 640), to view a list of tank delivery connectors (also known as "smart elbows") paired with the system (e.g. by selecting button 650), to set a master passkey (e.g. by selecting button 660), to set a system network name (e.g. by selecting button 670), or to view system diagnostics (e.g. by selecting button 680). Of course, some embodiments may include a settings screen that may allow more or less information to be viewed or more or less settings to be manipulated. Some embodiments may not include a settings graphical user interface.

Figure 7:
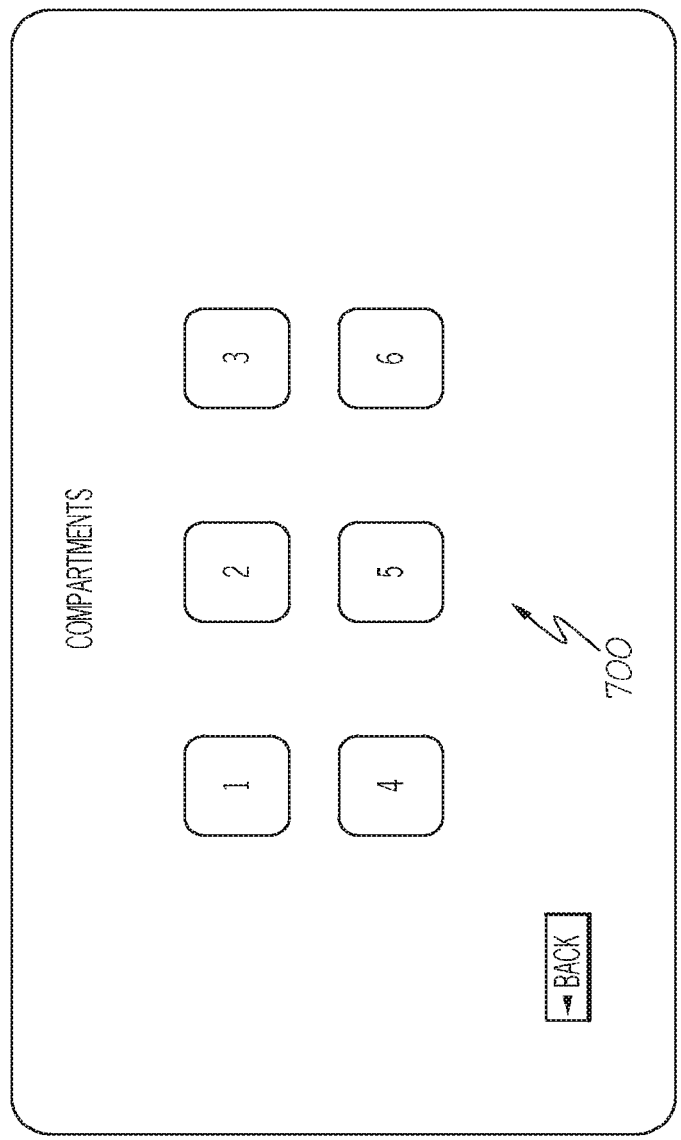
FIG. 7 schematically depicts a compartment number selection graphical user interface, according to one or more embodiments of the present disclosure.
Figure 8:
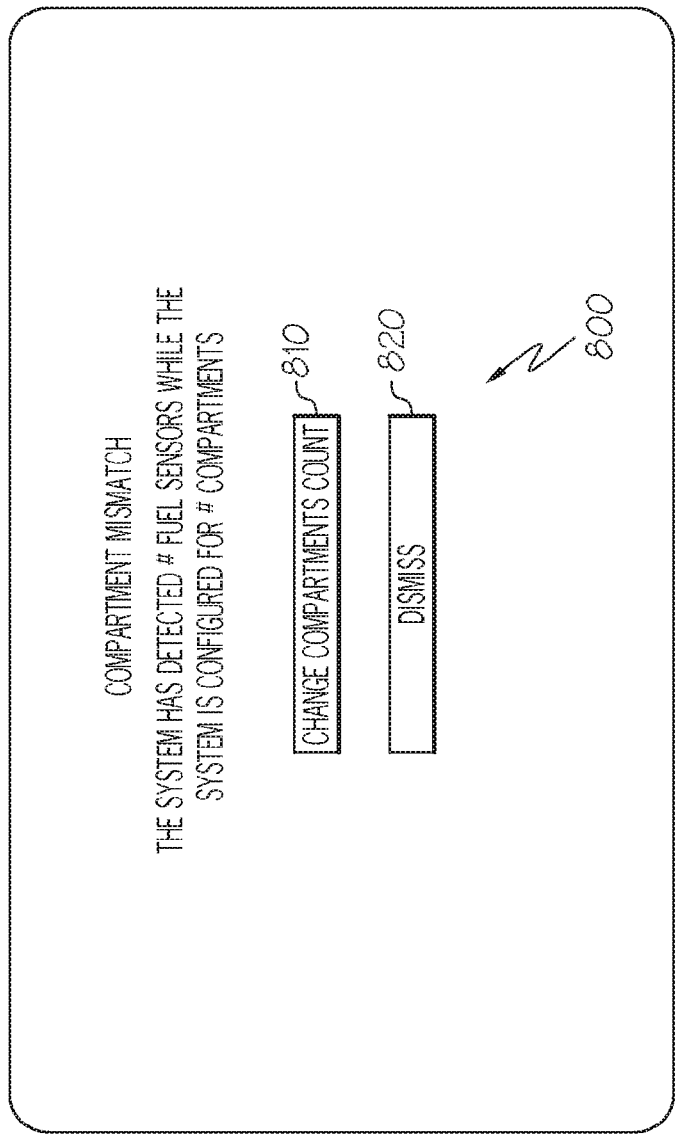
FIG. 8 schematically depicts a compartment mismatch graphical user interface, according to one or more embodiments of the present disclosure.

Referring to FIG. 6, in some embodiments in which the user selects the button 620, a graphical user interface 700 as shown in FIG. 7 may be displayed on the display 144 to allow a user to enter a number of tank compartments in the product delivery vehicle 102. The user may provide input in response to the displayed graphical user interface 700 indicative of a number of tank compartments included in the product delivery vehicle, and a signal indicative of the input number of tank compartments may be received from the tactile input hardware 138, from the display 144 (when the display 144 is a touchscreen), from the microphone 140, or the like. In some embodiments, the product delivery vehicle system 130 compares the number of tank compartments input by the user to a number of fluid property sensors included within the product delivery vehicle system 130. When the number of tank compartments input by the user does not match the number of fluid property sensors included within the product delivery vehicle system 130, an error graphical user interface, such as the error graphical user interface 800 depicted in FIG. 8 is displayed on the display 144. The error graphical user interface 800 includes a change compartments count button 810 (which may cause the graphical user interface 700 to be displayed again upon user selection) and a dismiss button 820 (which may cause the mismatch to be ignored and may cause a main graphical user interface to be displayed on the display 144).

Figure 9:
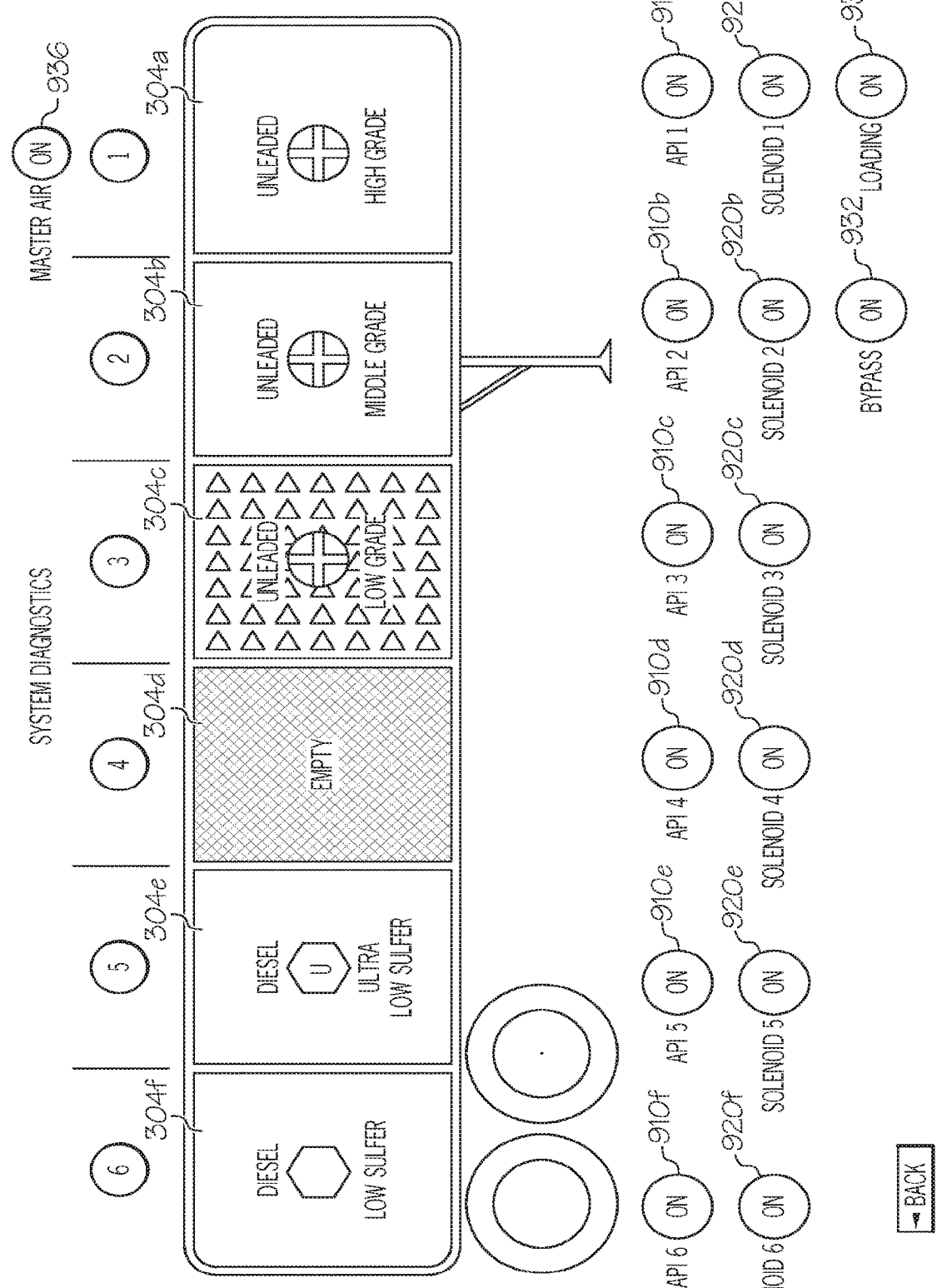
FIG. 9 schematically depicts a system diagnostics graphical user interface, according to one or more embodiments of the present disclosure.

Referring once again to FIG. 6, in some embodiments in which the user selects the button 680 to view systems diagnostics, the display 144 may show diagnostic and status information about various system components, such as the graphical user interface 900 of FIG. 9. Referring to FIG. 9, in addition to displaying a schematic representation of the product delivery vehicle and the graphical indications of the fuel types in the various tank compartments, the graphical user interface 900 also displays a bypass status indicator 932, a loading status indicator 934, a master air status indicator 936, a plurality of API status indicators, and a plurality of solenoid status indicators, which will be described in turn.

Referring to FIG. 9 in conjunction with FIGS. 1-2, in some embodiments, the bypass status indicator 232 is green when the system is in bypass mode (e.g., a mode in which a user has bypassed or overridden the operation of the crossover protection system in order to distribute fuel from a tank compartment of the product delivery vehicle 102) and red when the system is not in bypass mode. In some embodiments, the loading status indicator 234 is green when the system is in a loading mode (e.g., as described above with reference to FIGS. 3-5) and red when the system is not in the loading mode. In some embodiments, the master air status indicator 236 is green when a master air supply (e.g., a master air supply included on the product delivery vehicle 102 and operable to actuate the plurality of solenoid valves 120*a*, . . . , 1200 is on and red when the master air supply is off. In other embodiments, the bypass status, the master air status, and/or the loading status may be displayed differently, such as with text, color, shape, etc. indicative of the status to be indicated.

Still referring to FIG. 9 in conjunction with FIGS. 1-2, the graphical user interface 900 displays an API status indicator for an API control valve associated with each compartment of the product delivery vehicle. In particular, the graphical user interface 900 includes a first API status indicator 910*a*, a second API status indicator 910*b*, a third API status indicator 910*c*, a fourth API status indicator 910*d*, a fifth API status indicator 910e, and a sixth API status indicator 910f. The first API status indicator 910a is displayed proximate the first tank compartment graphic 304a and indicates the status of the first control valve 110a (which may be an API control valve in this example) associated with the first tank compartment 104a. The status of the first control valve 110a may be determined based on an output signal of the first control valve sensor 112a. The second API status indicator 910b is displayed proximate the second tank compartment graphic 304b and indicates the status of the second control valve 110b (which may be an API control valve in this example) associated with the second tank compartment 104b. The status of the second control valve 110b may be determined based on an output signal of the second control valve sensor 112b. The third API status indicator 910c is displayed proximate the third tank compartment graphic 304c and indicates the status of the third control valve 110c (which may be an API control valve in this example) associated with the third tank compartment 104c. The status of the third control valve 110c may be determined based on an output signal of the third control valve sensor 112c. The fourth API status indicator 910d is displayed proximate the fourth tank compartment graphic 304d and indicates the status of the fourth control valve 110d (which may be an API control valve in this example) associated with the fourth tank compartment 104d. The status of the fourth control valve 110d may be determined based on an output signal of the fourth control valve sensor 112d. The fifth API status indicator 910e is displayed proximate the fifth tank compartment graphic 304e and indicates the status of the fifth control valve 110e (which may be an API control valve in this example) associated with the fifth tank compartment 104e. The status of the fifth control valve 110e may be determined based on an output signal of the fifth control valve sensor 112e. The sixth API status indicator 910f is displayed proximate the sixth tank compartment graphic 304f and indicates the status of the sixth control valve 110f (which may be an API control valve in this example) associated with the sixth tank compartment 104f. The status of the sixth control valve 110f may be determined based on an output signal of the sixth control valve sensor 112f. In some embodiments, one or more of the API status indicators may indicate the status with text, color, shape, etc.

Still referring to FIG. 9 in conjunction with FIGS. 1-2, the graphical user interface 900 displays a solenoid status indicator for a solenoid valve associated with each compartment of the product delivery vehicle. In particular, the graphical user interface 900 includes a first solenoid status indicator 920a, a second solenoid status indicator 920b, a third solenoid status indicator 920c, a fourth solenoid status indicator 920d, a fifth solenoid status indicator 920e, and a sixth solenoid status indicator 920f. The first solenoid status indicator 920a is displayed proximate the first tank compartment graphic 304a and indicates the status of the first solenoid valve 120a associated with the first tank compartment 104a. The status of the first solenoid valve 120a may be determined based on an output signal of the first solenoid valve sensor 122a. The second solenoid status indicator 920b is displayed proximate the second tank compartment graphic 304b and indicates the status of the second solenoid valve 120b associated with the second tank compartment 104b. The status of the second solenoid valve 120b may be determined based on an output signal of the second solenoid valve sensor 122b. The third solenoid status indicator 920c is displayed proximate the third tank compartment graphic 304c and indicates the status of the third solenoid valve 120c associated with the third tank compartment 104c. The status of the third solenoid valve 120c may be determined based on an output signal of the third solenoid valve sensor 122c. The fourth solenoid status indicator 920d is displayed proximate the fourth tank compartment graphic 304d and indicates the status of the fourth solenoid valve 120d associated with the fourth tank compartment 104d. The status of the fourth solenoid valve 120d may be determined based on an output signal of the fourth solenoid valve sensor 122d. The fifth solenoid status indicator 920e is displayed proximate the fifth tank compartment graphic 304e and indicates the status of the fifth solenoid valve 120e associated with the fifth tank compartment 104e. The status of the fifth solenoid valve 120e may be determined based on an output signal of the fifth solenoid valve sensor 122e. The sixth solenoid status indicator 920f is displayed proximate the sixth tank compartment graphic 304f and indicates the status of the sixth solenoid valve 120f associated with the sixth tank compartment 104f. The status of the sixth solenoid valve 120f may be determined based on an output signal of the sixth solenoid valve sensor 122f. In some embodiments, one or more of the solenoid status indicators may indicate the status with text, color, shape, etc.

Figure 10:
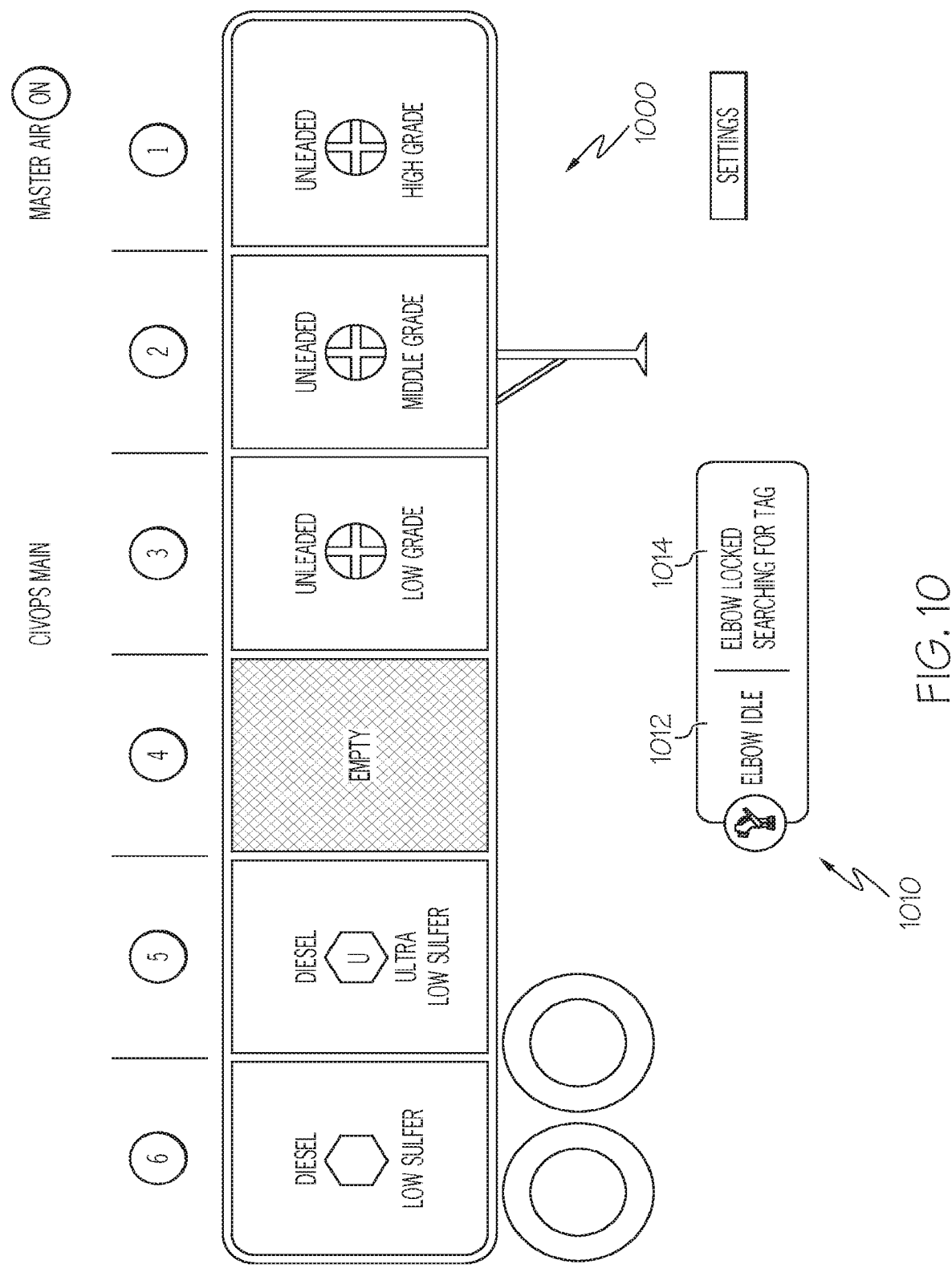
FIG. 10 schematically depicts a graphical user interface including tank delivery connector status information, according to one or more embodiments of the present disclosure.

Referring now to FIG. 10, in conjunction with FIGS. 1-2, a graphical user interface 1000 that includes a tank delivery connector status portion 1010 is schematically depicted. In some embodiments, when a tank delivery connector is paired with the product delivery vehicle system 130 (as will be described below), a tank delivery connector status graphic associated with the paired tank delivery connector will be displayed in the tank delivery connector status portion 1010. The tank delivery connector status portion 1010 displays status information for a plurality of tank delivery connectors, including the first tank delivery connector 150a and the second tank delivery connector 150b, each of which have been paired to the product delivery vehicle system 130. The status of the tank delivery connectors may include that the tank delivery connector has not yet been detected, that the tank delivery connector is idle (such as when the tank delivery connector has been paired with the product delivery vehicle system 130, but is not yet locked onto a distribution tank), that the tank delivery connector is locked into place on a distribution tank (which may be determined based on an output of the first lock sensor 157a or the second lock sensor 157b), that the tank delivery connector is searching for a tank tag (such as when the first tank tag reader 152a or the second tank tag reader 152b are activated, but have not yet read a tank tag), that the tank delivery connector has read the tank tag (such as when the first tank tag reader 152a or the second tank tag reader 152b have read a tank tag), that the tank delivery connector has read a tank tag of a particular fuel type (such as when the first tank tag reader 152a or the second tank tag reader 152b have read a tank tag and the tank delivery connector has transmitted a tank tag identifier indicative of the type of fuel included in the distribution tank associated with the tank tag), that fuel is flowing through the tank delivery connector, etc. In some embodiments, the product delivery vehicle system 130 may determine the tank delivery connector status information to display based on information transmitted (e.g., wirelessly) from the tank delivery connector to the product delivery vehicle system 130. In some embodiments, the tank delivery connector may transmit information (e.g., an output based on a signal provided by the lock sensor, an output from the tank tag reader, an output from the hose tag reader, an output from the orientation sensor, etc.) to the product delivery vehicle system 130 once the tank delivery connector detects that it is upright (e.g., based on an output from the first orientation sensor 158a or the second orientation sensor 158b), that the tank delivery connector is locked into place (e.g., based on an output from the first lock sensor 157a or the second lock sensor 157b), and that the tank delivery connector has read the tank tag. The communication between the tank delivery connector and the product delivery vehicle system 130 may be encrypted. The status of multiple tank delivery connectors may be displayed in the tank delivery connector status portion. For example, the tank delivery connector status portion 1010 includes a first tank delivery connector status graphic 1012 indicative of a status of the first tank delivery connector 150a (idle as shown in FIG. 10) and a second tank delivery connector status graphic 1014 indicative of a status of the second tank delivery connector 150b (locked and searching for a tag, as shown in FIG. 10).

With reference to FIGS. 1-2, a method for pairing the first tank delivery connector 150a to the product delivery vehicle system 130 will now be described. The first tank delivery connector 150a may be paired with the product delivery vehicle system 130 by positioning or swiping the first tank delivery connector 150a proximate the magnet 139 of the product delivery vehicle system 130. In response to the first tank delivery connector 150a being positioned or swiped proximate the magnet 139, the first magnetic sensor 159a of the first tank delivery connector 150a outputs a signal that causes the first network interface hardware 156a of the first tank delivery connector 150a to transmit a message including an identifier to the network interface hardware 136 of the product delivery vehicle system 130. The network interface hardware 136 receives the message and pairs the product delivery vehicle system 130 to the first tank delivery connector 150a. Once the first tank delivery connector 150a is paired with the product delivery vehicle system 130, the first tank delivery connector 150a may transmit further information regarding its operation and status (e.g., information related to the lock status, orientation, read hose tags, read tank tags, etc.). In some embodiments, the first tank delivery connector 150a may be in a lower power mode and is woken up from the low power mode in response to the signal generated by the first magnetic sensor 159a when the first tank delivery connector 150a is swiped or positioned proximate the magnet 139.

Figure 11:
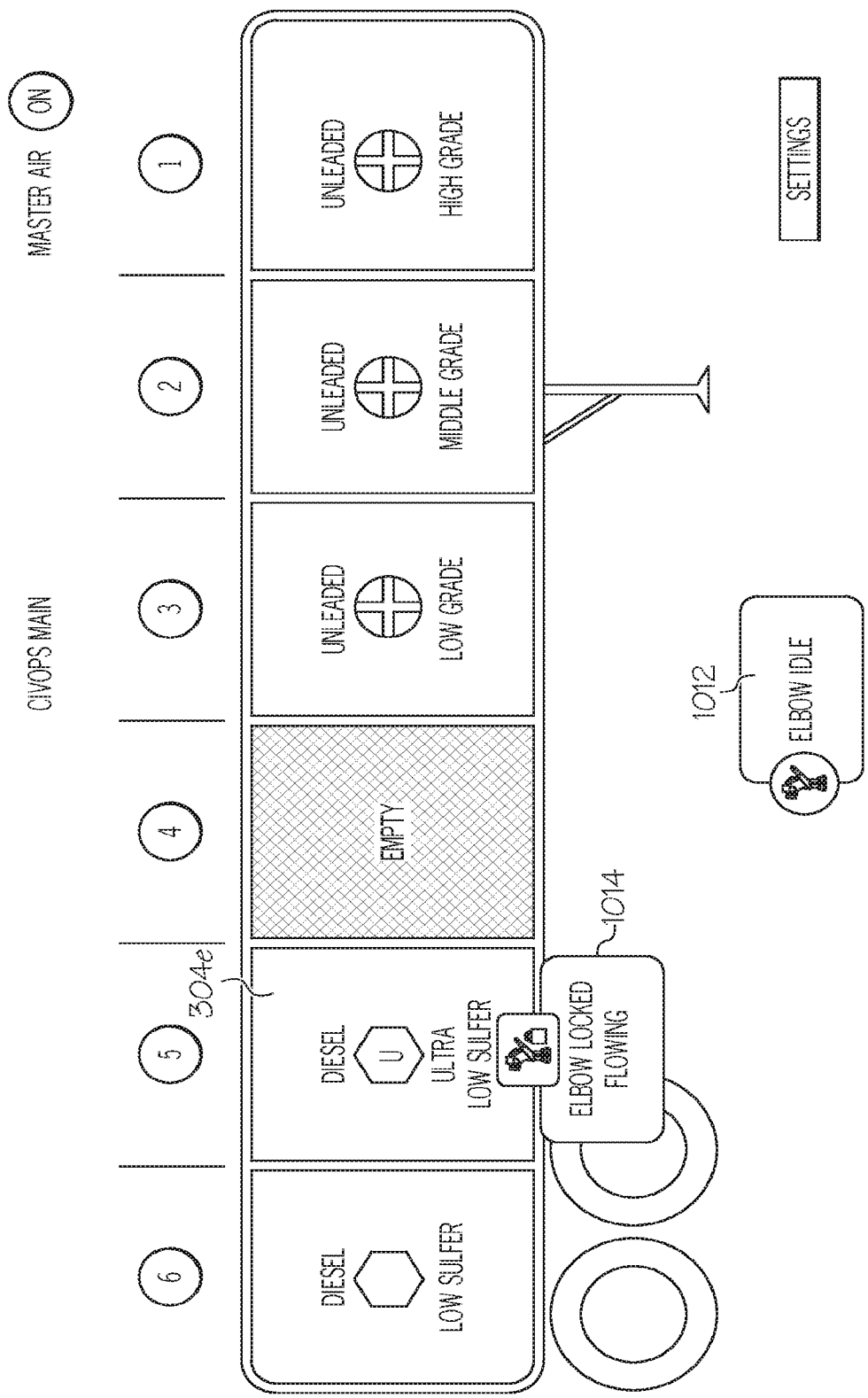
FIG. 11 schematically depicts a graphical user interface depicting a tank delivery connector, according to one or more embodiments of the present disclosure.

Some embodiments may display a graphical indication that a tank delivery connector is associated with a particular tank compartment of the product delivery vehicle, such as when the tank delivery connector reads a tank tag of a distribution tank containing the same fluid type as contained with the tank compartment. In some embodiments, a tank delivery connector is associated with a particular tank compartment of the product delivery vehicle 102 when: the tank delivery connector transmits, via network interface hardware of the tank delivery connector, a tank tag indicator associated with a tank tag of a distribution tank that is read with the tank tag reader of the tank delivery connector; the product delivery vehicle system 130 receives, via network interface hardware of the product delivery vehicle system 130, the tank tag indicator; the product delivery vehicle system 130 determines a distribution tank fuel type associated with the distribution tank based on the tank tag indicator (e.g., by accessing a look-up table or other data structure); and the product delivery vehicle system 130 determines that the tank delivery connector is associated with the tank compartment based on the tank tag indicator (e.g., when a fluid type associated with the tank tag indicator matches a fluid type of the tank compartment). In some embodiments, a tank delivery connector graphic is displayed proximate a tank compartment graphic to indicate that a tank delivery connector is associated with a tank compartment associated with the tank compartment graphic. For example, with reference to FIGS. 1-2, the second tank delivery connector 150b may read the second tank tag 174b of the second distribution tank 170b; the second tank delivery connector 150b may transmit, via the second network interface hardware 156b of the second tank delivery connector 150b, a tank tag indicator associated with the second tank tag 174b (e.g., a tank tag indicator indicating that the second distribution tank 170b contains ultra low sulfur diesel fuel); the product delivery vehicle system 130 may receive, via the network interface hardware 136 of the product delivery vehicle system 130, the tank tag indicator; the product delivery vehicle system 130 may determine that the distribution tank fuel type is ultra low sulfur diesel fuel based on the tank tag indicator (e.g., by accessing a look-up table or other data structure); and the product delivery vehicle system 130 may determine that the second tank delivery connector 150b is associated with the fifth tank compartment 104e based on the tank tag indicator because the fuel type of the fifth tank compartment 104e is also ultra low sulfur diesel. With reference to FIG. 11, the second tank delivery connector status graphic 1014 (which is associated with the second tank delivery connector 150b) may then be displayed proximate the fifth tank compartment graphic 304e (which is associated with the fifth tank compartment 104e) to indicate that the second tank delivery connector 150b is associated with the fifth tank compartment 104e.

When fuel is flowing from a particular tank compartment of the product delivery vehicle to a distribution tank through a particular tank delivery connector, the display 144 may display a tank delivery connector graphic proximate the tank compartment graphic from which the fuel is flowing to indicate that the tank delivery connector is associated with the tank compartment from which fuel is flowing through the tank delivery connector. For example, referring to FIG. 11, the second tank delivery connector status graphic 1014 is depicted proximate the fifth tank compartment graphic 304e to indicate that ultra low sulfur diesel is flowing from the fifth tank compartment 104e through the second tank delivery connector 150b and into a low sulfur diesel distribution tank on which the second tank delivery connector 150b is locked and fluidly coupled. The second tank delivery connector status graphic 1014 indicates that the status of the second tank delivery connector 150b is flowing.

In some embodiments, the status of a tank delivery connector may be determined as flowing when a fluid type of a tank tag read by the tank tag reader of the tank delivery connector matches a fluid type of the tank compartment of the distribution vehicle, a delivery hose is determined to fluidly couple the distribution tank to the tank delivery connector (e.g., based on a hose tag read by a hose tag reader of the product delivery vehicle system 130 and a hose tag read by the hose tag reader of the tank delivery connector), the tank delivery connector is locked onto the inlet of the distribution tank, and a control valve and a solenoid valve associated with the tank compartment are determined to be open. For example, referring to FIGS. 1-2, the second tank delivery connector 150b may be determined to be flowing when: a fluid type associated with the second tank tag 174b (which is read by the second tank tag reader 152b of the second tank delivery connector 150b) matches a fluid type associated with the fifth tank compartment 104e (which may have been manually input by a user, automatically determined based on a signal from the fifth fluid property sensor 106e, or set based on a combination of manual input and a signal from the fifth fluid property sensor 106e, as described above); the fifth hose tag reader 114e reads the second input-end hose tag 192b of the second delivery hose 190b (indicating that the second delivery hose 190b is fluidly coupled to the fifth tank compartment 104e); the second hose tag reader 153b of the second tank delivery connector 150b reads the second output-end hose tag 194b of the second delivery hose 190b (indicating that the second delivery hose 190b is fluidly coupled to the second tank delivery connector 150b); the second tank delivery connector 150b is in a locked configuration (which may be determined based on an output signal from the second lock sensor 157b); the fifth control valve 110e is open (which may be determined based on an output signal from the fifth control valve sensor 112e); and the fifth solenoid valve 120e is open (which may be determined based on an output signal from the fifth solenoid valve sensor 122e). In other embodiments, the status of the tank delivery connector may be determined as flowing in another manner, such as in any way in which fluid is described to flow from a tank compartment of a product delivery vehicle, through a tank delivery connector, and into a distribution tank, as described in U.S. patent application Ser. No. 14/075,336, filed Nov. 8, 2013, entitled "Cross Contamination Control Systems With Fluid Product ID Sensors," and published as U.S. Patent Application Publication No. 2014/0129038, the entirety of which is incorporated herein by reference.

Figure 12:
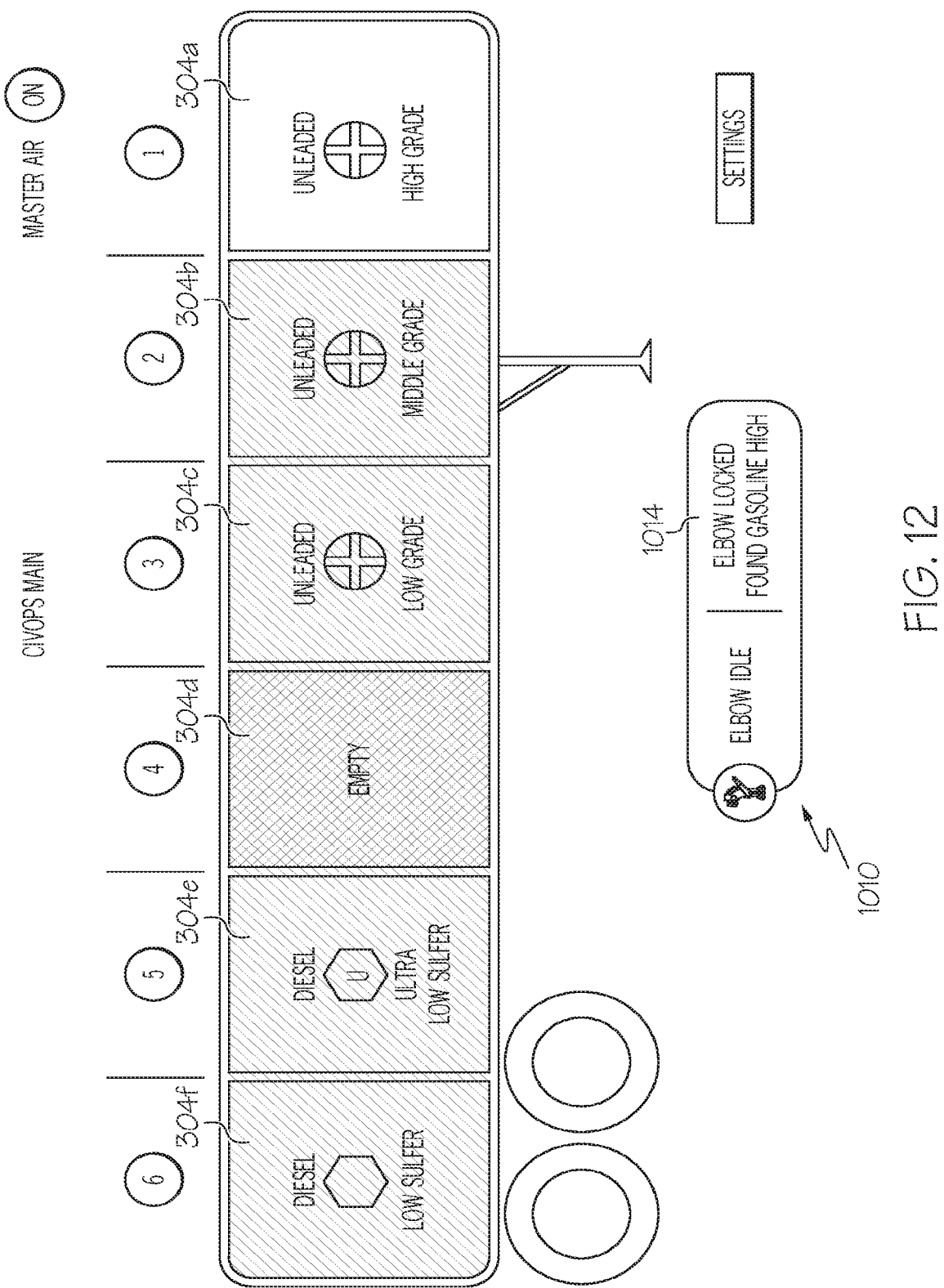
FIG. 12 schematically depicts a graphical user interface depicting a number of tank compartment graphics with inactive graphic indications, according to one or more embodiments of the present disclosure.

In some embodiments, when a tank delivery connector reads a tank tag associated with a distribution tank, tank compartment graphics that do not contain the same fuel type as the distribution tank associated with the tank tag may be displayed as inactive or locked out, as shown in FIG. 12. In the embodiment depicted in FIG. 12, the second tank delivery connector status graphic 1014 indicates that the tank delivery connector associated with it is locked to a distribution tank including high grade unleaded gasoline. As shown in FIG. 12, the first tank compartment graphic 304a (which is associated with the first tank compartment 104a that contains high grade unleaded gasoline) is depicted as active, while the other tank compartment graphics (which are associated with tank compartments that do not contain high grade unleaded gasoline) are displayed as inactive or locked out. In particular, an inactive graphic indication is displayed proximate each of the second tank compartment graphic 304b, the third tank compartment graphic 304c, the fourth tank compartment graphic 304d, the fifth tank compartment graphic 304e, and the sixth tank compartment graphic 304f. In the embodiment depicted in FIG. 12, the inactive graphic indication is a darker shading of each of the second tank compartment graphic 304b, the third tank compartment graphic 304c, the fourth tank compartment graphic 304d, the fifth tank compartment graphic 304e, and the sixth tank compartment graphic 304f. In other embodiments, the inactive graphic indication may be different such as in embodiments in which the inactive graphic indication is an inactive icon, a color that is different from the first tank compartment graphic 304a, which contains fuel of the same type as the tank tag, etc. As shown in FIG. 12, the inactive graphic indication is not displayed proximate the first tank compartment graphic 304a, which is displayed in the normal manner, indicating that the first tank compartment 104a is active and able to distribute fuel to the distribution tank associated with the tank tag.

Some embodiments may display a graphical indication that a tank delivery connector is associated with a particular tank compartment of the product delivery vehicle, such as when the tank delivery connector reads a tank tag of a distribution tank containing the same fluid type as contained with the tank compartment. In some embodiments, a tank delivery connector is associated with a particular tank compartment of the product delivery vehicle 102 when: the tank delivery connector transmits, via network interface hardware of the tank delivery connector, a tank tag indicator associated with a tank tag of a distribution tank that is read with the tank tag reader of the tank delivery connector; the product delivery vehicle system 130 receives, via network interface hardware of the product delivery vehicle system 130, the tank tag indicator; the product delivery vehicle system 130 determines a distribution tank fuel type associated with the distribution tank based on the tank tag indicator (e.g., by accessing a look-up table or other data structure); and the product delivery vehicle system 130 determines that the tank delivery connector is associated with the tank compartment based on the tank tag indicator (e.g., when a fluid type associated with the tank tag indicator matches a fluid type of the tank compartment).

In some embodiments, tank compartments of the product delivery vehicle 102 that match the fuel type of a distribution tank associated with a tank tag are graphically distinguished from tank compartments that do not match the fuel type of the distribution tank associated with the tank tag. For example, with reference to FIGS. 1-2, the first tank delivery connector 150a may read the first tank tag 174a of the first distribution tank 170a; the first tank delivery connector 150a may transmit, via the first network interface hardware 156a of the first tank delivery connector 150a, a tank tag indicator associated with the first tank tag 174a (e.g., a tank tag indicator indicating that the first distribution tank 170a contains high grade unleaded gasoline); the product delivery vehicle system 130 may receive, via the network interface hardware 136 of the product delivery vehicle system 130, the tank tag indicator; the product delivery vehicle system 130 may determine that the distribution tank fuel type is high grade unleaded gasoline based on the tank tag indicator (e.g., by accessing a look-up table or other data structure); and the product delivery vehicle system 130 may determine that the high grade unleaded gasoline fuel type of the first tank compartment 104a matches the high grade unleaded gasoline fuel type of the first distribution tank 170a, and may determine that the fuel types of the other tank compartments do not match the high grade unleaded gasoline fuel type of the first distribution tank 170a. The display 144 may then display a graphical user interface that graphically distinguishes the first tank compartment graphic 304a (associated with the first tank compartment 104a, which contains fuel that matches the type of the first distribution tank 170a) from the second tank compartment graphic 304b, the third tank compartment graphic 304c, the fourth tank compartment graphic 304d, the fifth tank compartment graphic 304e, and the sixth tank compartment graphic 304f (each of which contain fuel of a type that does not match the fuel type of the first distribution tank 170a). In the embodiment shown in FIG. 12, the first tank compartment graphic 304a is graphically distinguished from the other tank compartment graphics by shading the other tank compartment graphics darker, though in other embodiments, the tank compartment graphics may be graphically distinguished differently.

In some embodiments, the tank delivery connector reads a tank tag with the tank tag reader and transmit a tank tag indicator associated with the tank tag with network interface hardware in response to determining that the tank delivery connector is upright and determining that the tank delivery connector is locked onto a distribution tank.

Figure 13:
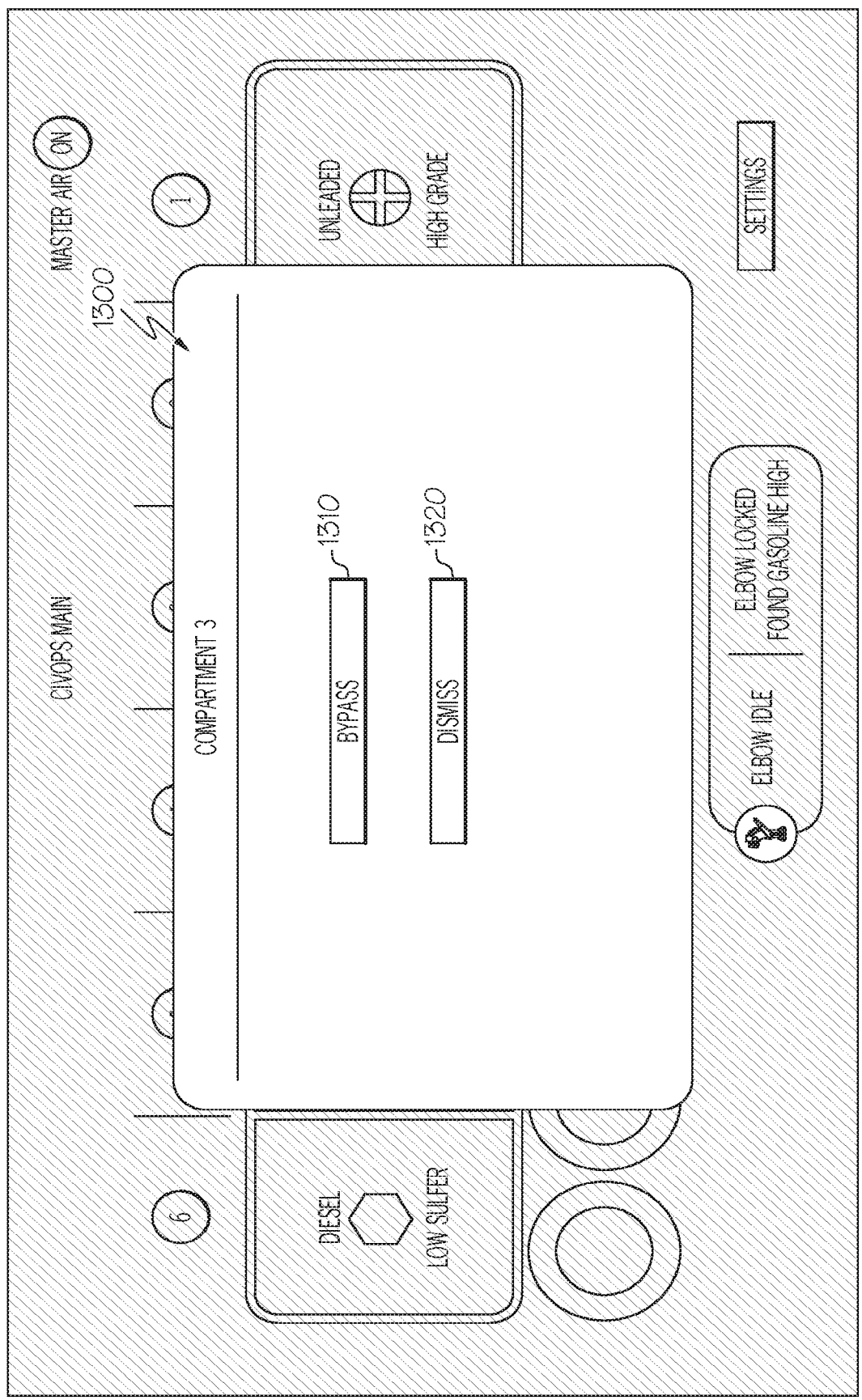
FIG. 13 schematically depicts a bypass prompt graphical user interface, according to one or more embodiments of the present disclosure.

In some embodiments, it may be desirable to allow a user to bypass the crossover protection features of the system, such as embodiments in which one or more of the system components or systems is malfunctioning or damaged or embodiments in which a tank tag is missing from a distribution tank, etc. When a user bypasses the crossover protection features of the system, it may be desirable to display a graphical indication of information relative to system operation in the bypass mode as described below. For example, in some embodiments, the user may be presented with a bypass prompt graphical user interface, such as the graphical user interface 1300 shown in FIG. 13 when a bypass is desired. In some embodiments, the graphical user interface 1300 shown in FIG. 13 is displayed in response to receiving user input indicative of a desire to deliver fuel from the third tank compartment 104c without regard to whether the system determines that it is appropriate to deliver fuel form the third tank compartment 104c (e.g., the system may not detect a match between the fuel type of the third tank compartment 104c and the fuel type indicated by a tank tag read by a delivery connector that is locked onto a distribution tank, as described above, which would require a bypass to deliver fuel from the third tank compartment 104c to the distribution tank onto which the tank delivery connector is locked onto). The graphical user interface 1300 includes a bypass button 1310 and a dismiss button 1320. Upon selecting the dismiss button 1320, the system may return to a normal operating condition and the system may not enter a bypass mode. Upon selecting the bypass button 1310, the system may enter a bypass mode in which fuel may be delivered from a specific tank compartment. Some embodiments may require a user to enter a bypass passcode before allowing or authorizing a bypass.

Figure 14:
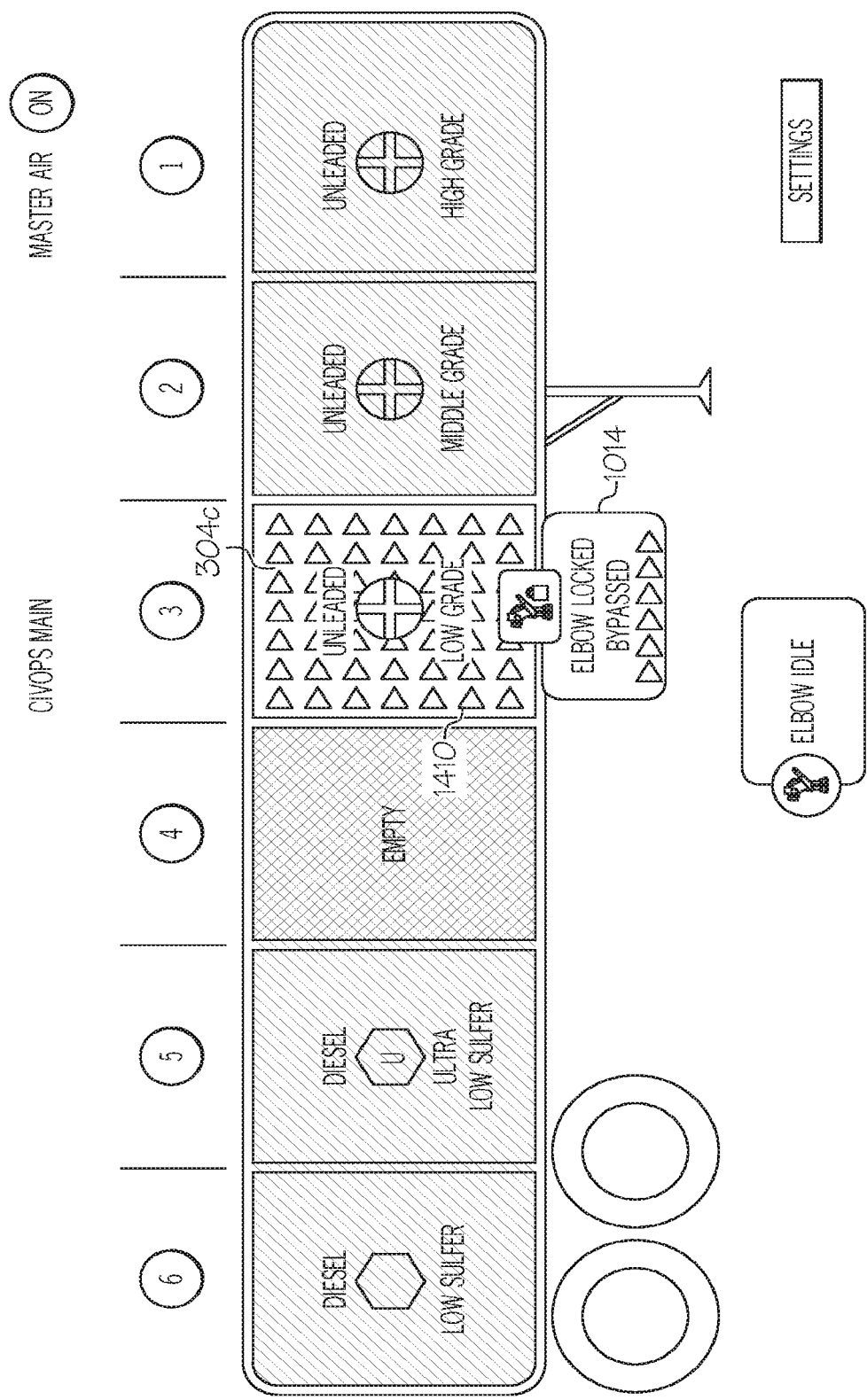
FIG. 14 schematically depicts a graphical user interface depicting a schematic representation of a product delivery vehicle in a bypass configuration, according to one or more embodiments of the present disclosure.

Upon selecting the bypass button 1310 of FIG. 13, a graphical user interface 1400 as shown in FIG. 14 may be displayed on the display 144. In particular, the graphical user interface 1400 may be displayed in response to receiving a bypass request as determined based on a user selection of the bypass button 1310. In response to receiving the bypass request, the graphical user interface shown on the display 144 may be updated to display a bypass graphic indication 1410 proximate the third tank compartment graphic 304c to indicate that fuel is allowed to flow from the third tank compartment 104c and through the tank connector associated with the second tank delivery connector status graphic 1014 via a bypass request. The depicted bypass graphic indication 1410 includes a plurality of triangular shapes, though embodiments are not limited thereto. For example, in some embodiments, the bypass graphic indication may include a shading of an associated tank compartment graphic, a bypass icon, a color of the associated tank compartment graphic, or the like. As shown in FIG. 14, the bypass indication is not displayed proximate the other tank compartments, which are displayed with inactive graphic indications. The second tank delivery connector status graphic 1014 of FIG. 14 also includes a bypass graphic indication, though other embodiments may not display a bypass graphic indication proximate the second tank delivery connector status graphic 1014.

Figure 15:
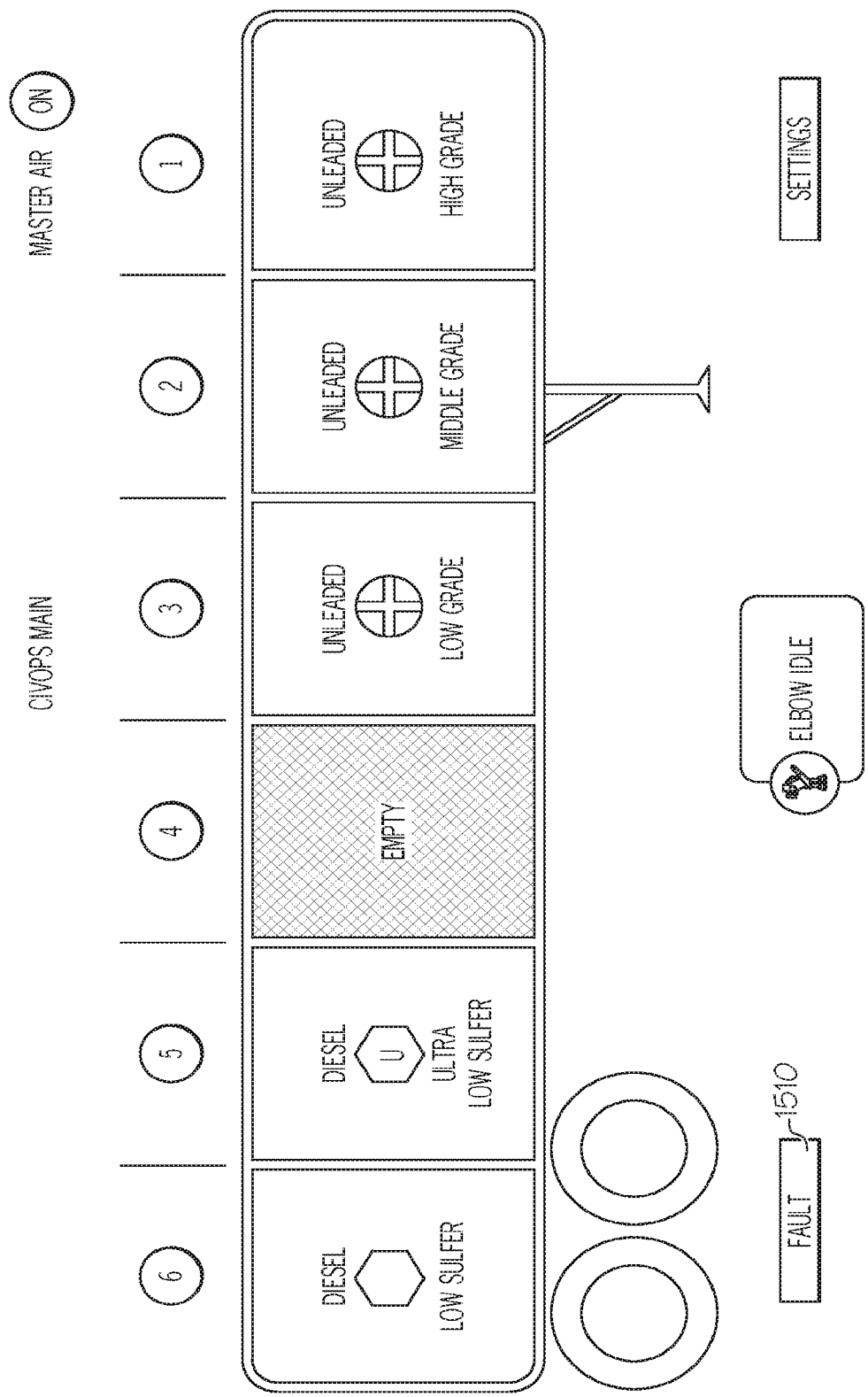
FIG. 15 schematically depicts a graphical user interface including a fault indication, according to one or more embodiments of the present disclosure.

If the system detects a fault condition, a fault indicator may be displayed on the graphical user interface, such as the fault indicator 1510 depicted in FIG. 15. Faults that may trigger the display of the fault indicator 1510 include a multi-tank-connector fault (two tank delivery connectors are locked onto distribution tanks at the same time without fuel flowing through either tank delivery connector); a tank compartment handle fault, a fuel sensor component fault, an override compartment fault, a tank delivery connector communication fault, a fuel sensor count fault, or the like. In some embodiments, when a user selects the displayed fault indicator 1510, one or more dialog boxes including information about the detect fault or faults may be displayed.

It should now be understood that embodiments described herein include graphical user interfaces displayed on display screens of crossover protection systems that mitigate the risk of potential crossover and allow an operator of the product delivery vehicle and crossover protection system to deliver multiple types of fuel or other liquid to distribution tanks at a distribution facility in a quick and efficient manner while mitigating the risk of crossover. Furthermore, the graphical user interfaces described herein may allow a user of a crossover protection system to easily and quickly ascertain information pertaining to the fuel types loaded in the various compartments of a fuel delivery vehicle and to easily and quickly ascertain the status of various system components.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A crossover protection system comprising:
an electronic control unit comprising a processor, a network interface hardware communicatively coupled to the processor, at least one memory module communicatively coupled to the processor, and machine readable instructions stored in the at least one memory module;
a tank delivery connector communicatively coupled to the electronic control unit, the tank delivery connector comprising a tank tag reader communicatively coupled to the processor and configured to read a tank tag;
a display communicatively coupled to the electronic control unit, wherein:
the machine readable instructions stored in the at least one memory module cause the electronic control unit to perform at least the following when executed by the processor:
receive a tank tag indicator from the tank tag reader;
determine a distribution tank fuel type associated with a distribution tank based on the tank tag indicator;
determine that the tank delivery connector is associated with a first tank compartment of a product delivery vehicle based on the tank tag indicator; and
display a graphical user interface on the display, the graphical user interface comprising:
a schematic representation of the product delivery vehicle, the schematic representation including a plurality of tank compartment graphics, each tank compartment graphic of the plurality of tank compartment graphics depicting a tank compartment of the product delivery vehicle, the plurality of tank compartment graphics including a first tank compartment graphic and a second tank compartment graphic, wherein the first tank compartment graphic is associated with the first tank compartment of the product delivery vehicle and the second tank compartment graphic is associated with a second tank compartment of the product delivery vehicle; and a tank delivery connector graphic displayed proximate the first tank compartment graphic or the second tank compartment graphic to indicate that the tank delivery connector is associated with the first tank compartment or the second tank compartment, respectively.

2. The crossover protection system of claim 1, wherein the tank delivery connector graphic is displayed proximate the first tank compartment graphic to indicate that fuel is flowing through the tank delivery connector from the first tank compartment.

3. The crossover protection system of claim 1, wherein the graphical user interface further comprises a plurality of graphical indications of fuel type, wherein the plurality of graphical indications of fuel type include a first graphical indication of fuel type and a second graphical indication of fuel type, wherein the first graphical indication of fuel type is displayed proximate the first tank compartment graphic, thereby indicating that the first tank compartment includes a first fuel type, wherein the second graphical indication of fuel type is displayed proximate the second tank compartment graphic, thereby indicating that the second tank compartment includes a second fuel type.

4. The crossover protection system of claim 1, the graphical user interface further comprising a bypass status indicator, a loading status indicator, and a master air status indicator.

5. The crossover protection system of claim 1, the graphical user interface further comprising a plurality of API status indicators and a plurality of solenoid status indicators, wherein the plurality of API status indicators includes a first API status indicator and a second API status indicator, wherein the plurality of solenoid status indicators includes a first solenoid status indicator and a second solenoid status indicator, wherein the first API status indicator and the first solenoid status indicator are displayed proximate the first tank compartment, wherein the second API status indicator and the second solenoid status indicator are displayed proximate the second tank compartment.

6. The crossover protection system of claim 1, the graphical user interface further comprising a tank delivery connector status portion.

7. The crossover protection system of claim 6, wherein the tank delivery connector status portion displays status information for a plurality of tank delivery connectors, wherein the status information for a first tank delivery connector of the plurality of tank delivery connectors includes that the first tank delivery connector has not yet been detected, that the first tank delivery connector is idle, that the first tank delivery connector is locked into place on the distribution tank, that the first tank delivery connector is searching for the tank tag, that the first tank delivery connector has read the tank tag, that the first tank delivery connector has read the tank tag of a particular fuel type, or that fuel is flowing through the first tank delivery connector.

8. The crossover protection system of claim 1, wherein:
the first tank compartment graphic is associated with the first tank compartment including a first fuel type that matches the distribution tank fuel type;
the second tank compartment graphic is associated with the second tank compartment including a second fuel type that does not match the distribution tank fuel type; and the graphical user interface further comprises an inactive graphic indication displayed proximate the second tank compartment graphic.

9. The crossover protection system of claim 8, wherein the inactive graphic indication is not displayed proximate the first tank compartment graphic.

10. The crossover protection system of claim 1, wherein the machine readable instructions cause the electronic control unit to perform the following when executed by the processor:
receive a bypass request to bypass crossover protection of the first tank compartment; and
in response to receiving the bypass request, display a bypass graphic indication proximate the first tank compartment graphic.

11. The crossover protection system of claim 1, wherein the machine readable instructions stored in the at least one memory module cause the electronic control unit to perform at least the following when executed by the processor:
determine a first fluid type of a fluid in the first tank compartment from a signal indicative of a sensed fluid property received from a first fluid property sensor positioned to contact the fluid in the first tank compartment;
determine a second fluid type of a fluid in the second tank compartment from a signal indicative of a sensed fluid property received from a second fluid property sensor positioned to contact the fluid in the second tank compartment;
display the first fluid type proximate the first tank compartment graphic of the graphical user interface to indicate the first fluid type of the fluid in the first tank compartment; and
display the second fluid type proximate the second tank compartment graphic of the graphical user interface to indicate the second fluid type of the fluid in the second tank compartment.

12. A crossover protection system comprising:
a product delivery vehicle including a plurality of tank compartments;
an electronic control unit comprising a processor, a network interface hardware communicatively coupled to the processor, at least one memory module communicatively coupled to the processor, and machine readable instructions stored in the at least one memory module;
a display communicatively coupled to the electronic control unit;
wherein the machine readable instructions stored in the at least one memory module cause the electronic control unit to perform at least the following when executed by the processor:
enter a loading mode in response to one or more of the following:
receiving user input indicative of a desire to enter a loading mode;
detecting a socket or a component that interfaces with the product delivery vehicle when the product delivery vehicle is at a loading depot; and
powering on the electronic control unit; and
display a graphical user interface on the display during the loading mode, the graphical user interface comprising:
a schematic representation of the product delivery vehicle, the schematic representation including a plurality of tank compartment graphics, each tank compartment graphic of the plurality of tank compartment graphics depicting a tank compartment of the product delivery vehicle, the plurality of tank compartment graphics including a first tank compartment graphic and a second tank compartment graphic, wherein the first tank compartment graphic is associated with the first tank compartment of the product delivery vehicle and the second tank compartment graphic is associated with a second tank compartment of the product delivery vehicle; and a plurality of graphical indications of fuel type, wherein the plurality of graphical indications of fuel type include a first graphical indication of fuel type and a second graphical indication of fuel type, wherein the first graphical indication of fuel type is displayed proximate the first tank compartment graphic, thereby indicating that the first tank compartment includes a first fuel type, wherein the second graphical indication of fuel type is displayed proximate the second tank compartment graphic, thereby indicating that the second tank compartment includes a second fuel type.

13. The crossover protection system of claim 12, wherein each of the plurality of graphical indications of fuel type includes text indicative of the fuel type.

14. The crossover protection system of claim 12, wherein each of the plurality of graphical indications of fuel type includes a symbol representative of the fuel type.

15. The crossover protection system of claim 12, wherein each of the plurality of graphical indications of fuel type includes a color associated with the fuel type.

16. The crossover protection system of claim 12, wherein the machine readable instructions stored in the at least one memory module further cause the electronic control unit to perform at least the following when executed by the processor:

determine the first fluid type of a fluid in the first tank compartment from a signal indicative of a sensed fluid property received from a first fluid property sensor positioned to contact the fluid in the first tank compartment; and display the first fluid type proximate the first tank compartment graphic of the graphical user interface to indicate the first fluid type of the fluid in the first tank compartment.

17. The crossover protection system of claim 16, wherein the machine readable instructions stored in the at least one memory module further cause the electronic control unit to perform at least the following when executed by the processor:

determine the second fluid type of a fluid in the second tank compartment from a signal indicative of a sensed fluid property received from a second fluid property sensor positioned to contact the fluid in the second tank compartment; and display the second fluid type proximate the second tank compartment graphic of the graphical user interface to indicate the second fluid type of the fluid in the second tank compartment.

18. The crossover protection system of claim 12, wherein the machine readable instructions stored in the at least one memory module further cause the electronic control unit to perform at least the following when executed by the processor:

receive a user input indicative of the first fluid type of a fluid in the first tank compartment; and display the first fluid type proximate the first tank compartment graphic of the graphical user interface to indicate the first fluid type of the fluid in the first tank compartment.

19. The crossover protection system of claim 12, wherein the machine readable instructions stored in the at least one memory module further cause the electronic control unit to perform at least the following when executed by the processor:

receive a signal indicative of a sensed fluid property from a first fluid property sensor positioned to contact a fluid in the first tank compartment;

determine a category of fuel of the fluid in the first tank compartment from the signal received from the first fluid property sensor; and prompt the user to select the first fluid type of the fluid in the first tank compartment.

20. The crossover protection system of claim 12, wherein the machine readable instructions stored in the at least one memory module further cause the electronic control unit to perform at least the following when executed by the processor:

determine that the first tank compartment is empty from a signal indicative of a sensed pressure within the first tank compartment output by a first pressure sensor associated with the first tank compartment;

set the first fluid type to empty; and display the first fluid type proximate the first tank compartment graphic of the graphical user interface to indicate the first tank compartment is empty.

* * * * *